United States Patent
Hazzard et al.

(10) Patent No.: US 11,485,396 B2
(45) Date of Patent: Nov. 1, 2022

(54) POWER SYSTEM FOR MOBILE WORKSTATION

(71) Applicant: Ergotron, Inc., St. Paul, MN (US)

(72) Inventors: Nicholas Simon Hazzard, Minneapolis, MN (US); William Dale Tischer, Shoreview, MN (US); John William Theis, St. Paul, MN (US); Matthew J. Janechek, Maplewood, MN (US); Troy Edward Townes, Minneapolis, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 16/290,831

(22) Filed: Mar. 1, 2019

(65) Prior Publication Data
US 2019/0270471 A1    Sep. 5, 2019

Related U.S. Application Data

(60) Provisional application No. 62/637,497, filed on Mar. 2, 2018.

(51) Int. Cl.
*H02J 7/00* (2006.01)
*B62B 5/00* (2006.01)
(Continued)

(52) U.S. Cl.
CPC .............. *B62B 5/00* (2013.01); *B62B 3/02* (2013.01); *H02J 7/0072* (2013.01); *H02J 7/02* (2013.01); *H02J 9/062* (2013.01); *H02J 50/80* (2016.02)

(58) Field of Classification Search
CPC .. H02J 7/02; H02J 7/0072; H02J 9/062; H02J 50/80; B62B 5/00; B62B 3/02; B62B 2202/56; B62B 2206/06
See application file for complete search history.

(56) References Cited

U.S. PATENT DOCUMENTS 6,980,419 B2    12/2005    Smith et al.
7,800,341 B2     9/2010    Stone et al.
(Continued)

FOREIGN PATENT DOCUMENTS

CN    206727699 U    12/2017
CN    110809912 A     2/2020
(Continued)

OTHER PUBLICATIONS

"International Application Serial No. PCT/US2019/020431, International Search Report dated May 9, 2019", 2 pgs.
(Continued)

*Primary Examiner* — Richard Isla
*Assistant Examiner* — Johali A Torres Ruiz
(74) *Attorney, Agent, or Firm* — Schwegman Lundberg & Woessner, P.A.

(57) ABSTRACT

A mobile powered workstation can include a head unit assembly that can have at least one power outlet configured to provide power to at least one electronic device. The workstation can include a power system coupled to the head unit assembly. The power system can include a permanent battery and a battery assembly. The battery assembly can include a battery connection housing that can have a plurality of power connectors configured to electrically couple to a corresponding plurality of power connectors of a replaceable battery, the battery connection housing can have a first face and a second face that extends from the first face. The first face can define a first raised portion configured to engage with a corresponding first recessed portion in the replaceable battery. The second face can define a second raised portion configured to engage with a corresponding second recessed portion in the replaceable battery.

19 Claims, 18 Drawing Sheets

(51) Int. Cl.
*B62B 3/02* (2006.01)
*H02J 50/80* (2016.01)
*H02J 7/02* (2016.01)
*H02J 9/06* (2006.01)

(56) References Cited

U.S. PATENT DOCUMENTS

| | | | |
|---|---|---|---|
| 8,338,985 B2 | 12/2012 | Murtha et al. | |
| 9,232,855 B2 | 1/2016 | Ergun et al. | |
| 2004/0262867 A1* | 12/2004 | Arceta | A61G 12/001 280/47.35 |
| 2007/0072443 A1 | 3/2007 | Rohrbach et al. | |
| 2008/0251661 A1* | 10/2008 | Rossini | F16M 11/42 248/176.1 |
| 2009/0212848 A1 | 8/2009 | Coonan et al. | |
| 2009/0261656 A1* | 10/2009 | Coonan | G06F 1/26 307/80 |
| 2010/0231165 A1* | 9/2010 | Griffin, Jr. | H02J 7/0042 320/112 |
| 2013/0076137 A1 | 3/2013 | Murtha et al. | |
| 2013/0190759 A1 | 7/2013 | Waaler et al. | |
| 2014/0152099 A1* | 6/2014 | Boyd | H02J 9/04 320/134 |
| 2014/0167506 A1 | 6/2014 | Wood et al. | |
| 2014/0344610 A1* | 11/2014 | Ross | H02J 9/00 713/340 |
| 2015/0047538 A1 | 2/2015 | Ergun et al. | |
| 2015/0123611 A1 | 5/2015 | Huang | |
| 2015/0227127 A1* | 8/2015 | Miller | G16H 20/13 700/244 |
| 2015/0295447 A1 | 10/2015 | Nitz | |
| 2015/0303695 A1* | 10/2015 | Perry | G01R 31/382 307/80 |
| 2015/0362333 A1* | 12/2015 | Miller | H01M 50/342 340/870.02 |
| 2016/0126513 A1 | 5/2016 | Mifsud | |
| 2016/0221671 A1* | 8/2016 | Fisher | B64C 39/02 |
| 2016/0293912 A1* | 10/2016 | Manion | B25F 5/02 |
| 2017/0141597 A1* | 5/2017 | Mifsud | H02J 7/0027 |
| 2017/0351317 A1* | 12/2017 | Tan | H04W 52/0296 |
| 2018/0131054 A1* | 5/2018 | Waid | H01M 10/486 |

FOREIGN PATENT DOCUMENTS

| | | |
|---|---|---|
| CN | 114828522 A | 7/2022 |
| WO | WO-2014153467 A2 | 9/2014 |
| WO | WO-2019169352 A1 | 9/2019 |

OTHER PUBLICATIONS

"International Application Serial No. PCT/US2019/020431, Written Opinion dated May 9, 2019", 10 pgs.

"Chinese Application Serial No. 201980093301.0, Office Action dated Jul. 27, 2020", w/English translation, 26 pgs.

"International Application Serial No. PCT/US2019/920431, International Preliminary Report on Patentability dated Sep. 17, 2020", 12 pgs.

"Chinese Application Serial No. 201980003301.0, Office Action dated Jun. 15, 2021", w/o English Translation, 11 pgs.

"Chinese Application Serial No. 201980003301.0, Response filed Feb. 18, 2021 to Office Action dated Jul. 27, 2020", w/ English claims, 14 pgs.

"European Application Serial No. 19760053.9, Response to Communication Pursuant to Rules 161 and 162 filed Apr. 9, 2021", 15 pgs.

"Chinese Application Serial No. 201980003301.0, Decision of Rejection dated Jan. 25, 2022", w/o English Translation, 7 pgs.

"Chinese Application Serial No. 201980003301.0, Response filed Nov. 1, 2021 to Office Action dated Jun. 15, 2021", w/o English Claims, 4 pgs.

"European Application Serial No. 19760053.9, Extended European Search Report dated Oct. 28, 2021", 9 pgs.

* cited by examiner

POWER SYSTEM FOR MOBILE WORKSTATION

CLAIM OF PRIORITY

This patent application claims the benefit of priority of Hazzard, et al. U.S. Provisional Patent Application Ser. No. 62/637,497, entitled "POWER SYSTEM FOR MOBILE WORKSTATION," filed on Mar. 2, 2018, which is hereby incorporated by reference herein in its entirety.

TECHNICAL FIELD

This disclosure pertains generally, but not by way of limitation, to power systems.

BACKGROUND

Mobile workstations, such as computing carts, are used to provide portable computing capabilities to workers in a variety of settings. One example includes computing carts used by health care professionals in a hospital or clinic setting. Another example includes computing carts used by teachers in a school setting. In many cases a computing cart generally includes a wheeled base that supports a computer as well as a number of other items, including for example, storage compartments, drawers, work surfaces, keyboards and pointing devices and associated trays, electronic display(s), and other items.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

OVERVIEW

This disclosure is directed to a power system for a computing cart. More particularly, the power system can include a resident battery (e.g., permanent battery) and a replaceable battery designed to provide power to computing devices located on or coupled to the cart. The particular mode of operation, e.g., hot swap and plug-in charge, can be selected by the user.

DETAILED DESCRIPTION

Figure 1:
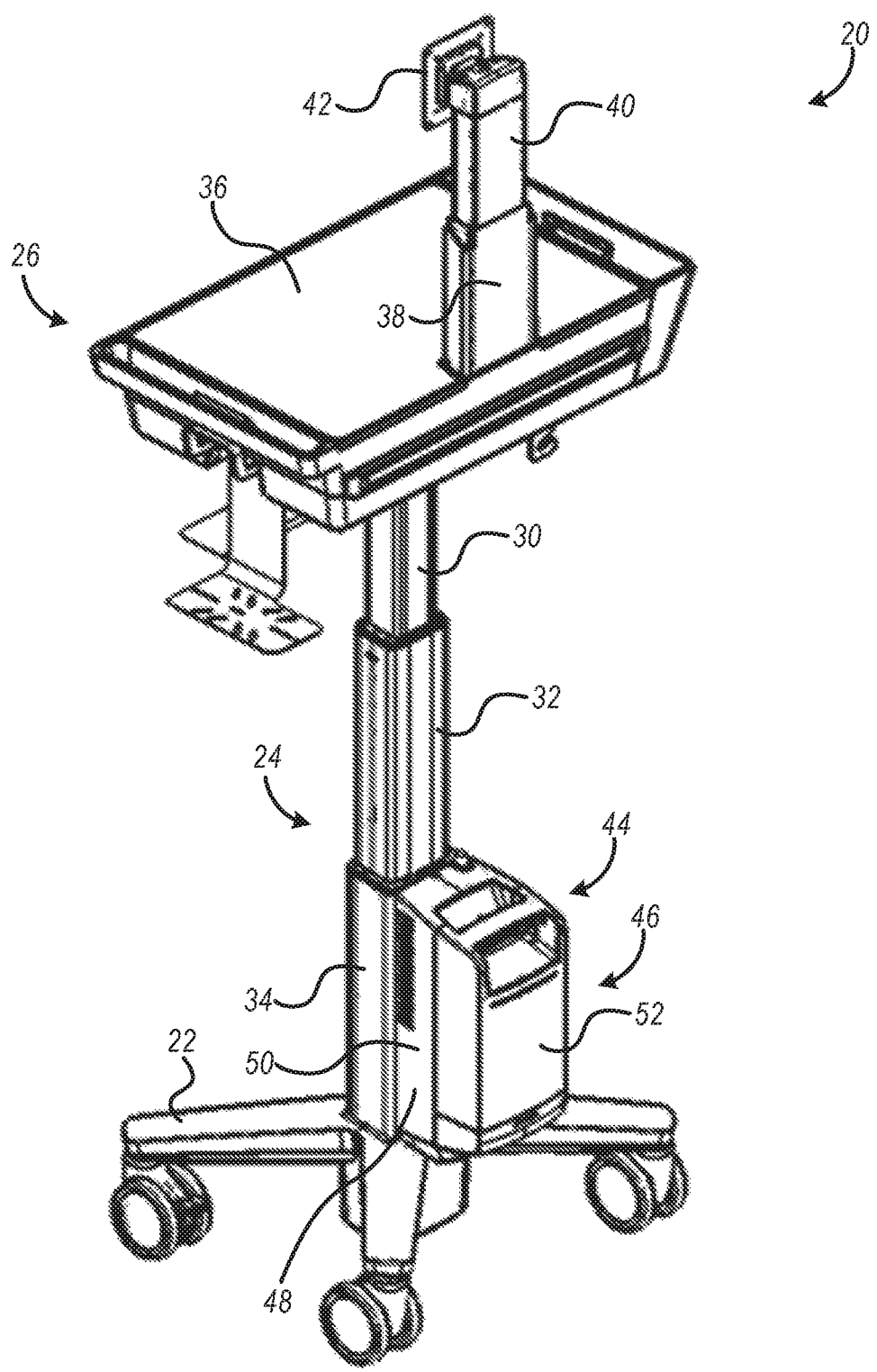
FIG. 1 is a perspective view of an example of a mobile workstation including a power system that can implement various techniques of this disclosure.

FIG. 1 is a perspective view of an example of a mobile workstation including a power system that can implement various techniques of this disclosure. The mobile workstation 20 can include a base 22, e.g., wheeled base, a head unit riser 24, a head unit assembly 26, and a display riser 28, e.g., for electronic displays. In the example configuration shown in FIG. 1, the head unit riser 24 is a three-member telescoping column, including a first member 30, a second member 32, and a third member 34. The third member 34 can be attached to the wheeled base 22, the second member 32 can be slidingly engaged with the third member 34, and the first member 30 can be slidingly engaged with the second member 32. An example of a three-member telescoping configuration is shown and described in commonly assigned U.S. Pat. No. 9,232,855 to Mustafa Ergun et al., the entire contents of which being incorporated herein by reference, specifically the portions related to FIGS. 1-8B and FIGS. 39-42.

The head unit assembly 26 can include a planar worksurface 36 and storage compartment under the worksurface and configured to house a computing device, such as a laptop computer. The head unit assembly 26 can further include one or more AC receptacles or power outlets, e.g., on a power strip, to provide power to the computing device and an electronic display. The head unit assembly 26 can be electrically coupled to the power system including the battery assembly using power and data cords, as described below.

The head unit assembly 26 can be connected to the upper end of the telescoping column formed by members 30-34 and the display riser 28 can be coupled to the head unit assembly 26. The display riser 28 can include a stationary member 38 coupled to the head unit assembly 26 and a movable member 40 coupled to a display mount 42 for adjusting a position of an electronic display mounted to the display mount.

The power system 44 of the mobile workstation 20 can include a replaceable battery assembly 46, e.g., connected to the third member 34, and a resident battery assembly 48 (or "resident battery"), e.g., coupled to the base 22. The battery assembly 46 can include a battery connection housing 50 and a replaceable battery 52. In some example configurations, the replaceable battery 52 can be a rechargeable battery. In this disclosure, a replaceable battery can be a battery that is designed to be easily detached, e.g., without tools, and removed from the workstation for recharging, for example. In contrast, a resident battery (also referred to as a "permanent battery" in this disclosure) can be designed to remain permanently attached to the workstation unless tools are used to remove it.

As shown and described in detail below, the battery connection housing 50 and the replaceable battery 52 can include matching or complementary features, e.g., ridges and notches, that allow the two to engage and mate with one another. A "ridge" can be a raised portion and a "notch" can be a recessed portion having a shape and depth that is complementary with the shape and height of the raised portion. In some example configurations, one or both of the battery connection housing 50 and replaceable battery 52 can include one or more magnets to magnetically latch or secure the replaceable battery 52 to the battery connection housing 50.

In addition, as described in more detail below, the power system can include multiple modes of operation including a hot swap mode and a resident battery mode, which can be selected by the user.

Figure 2:
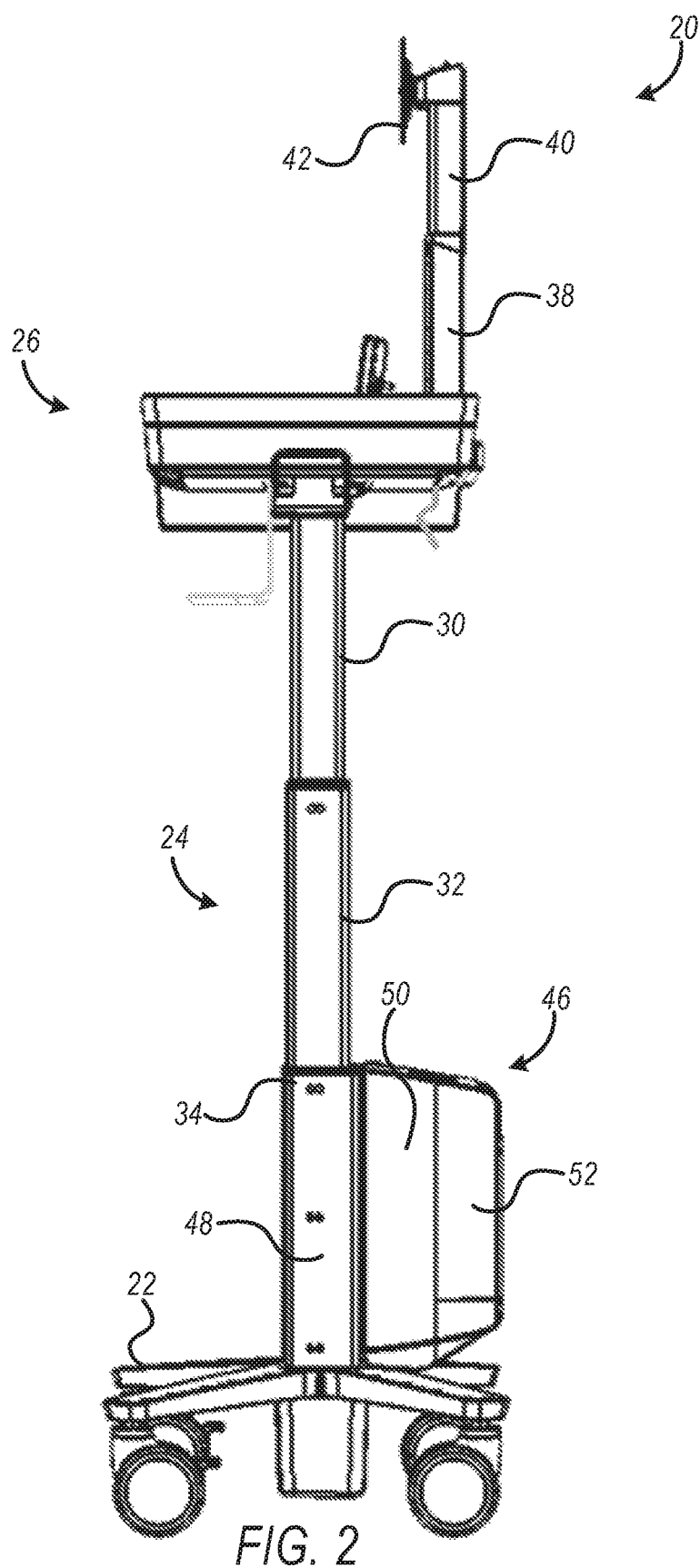
FIG. 2 is a side view of the mobile workstation of FIG. 1.

FIG. 2 is a side view of the mobile workstation of FIG. 1. For purposes of conciseness, the mobile workstation 20 of FIG. 2 will not be described in detail.

Figure 3:
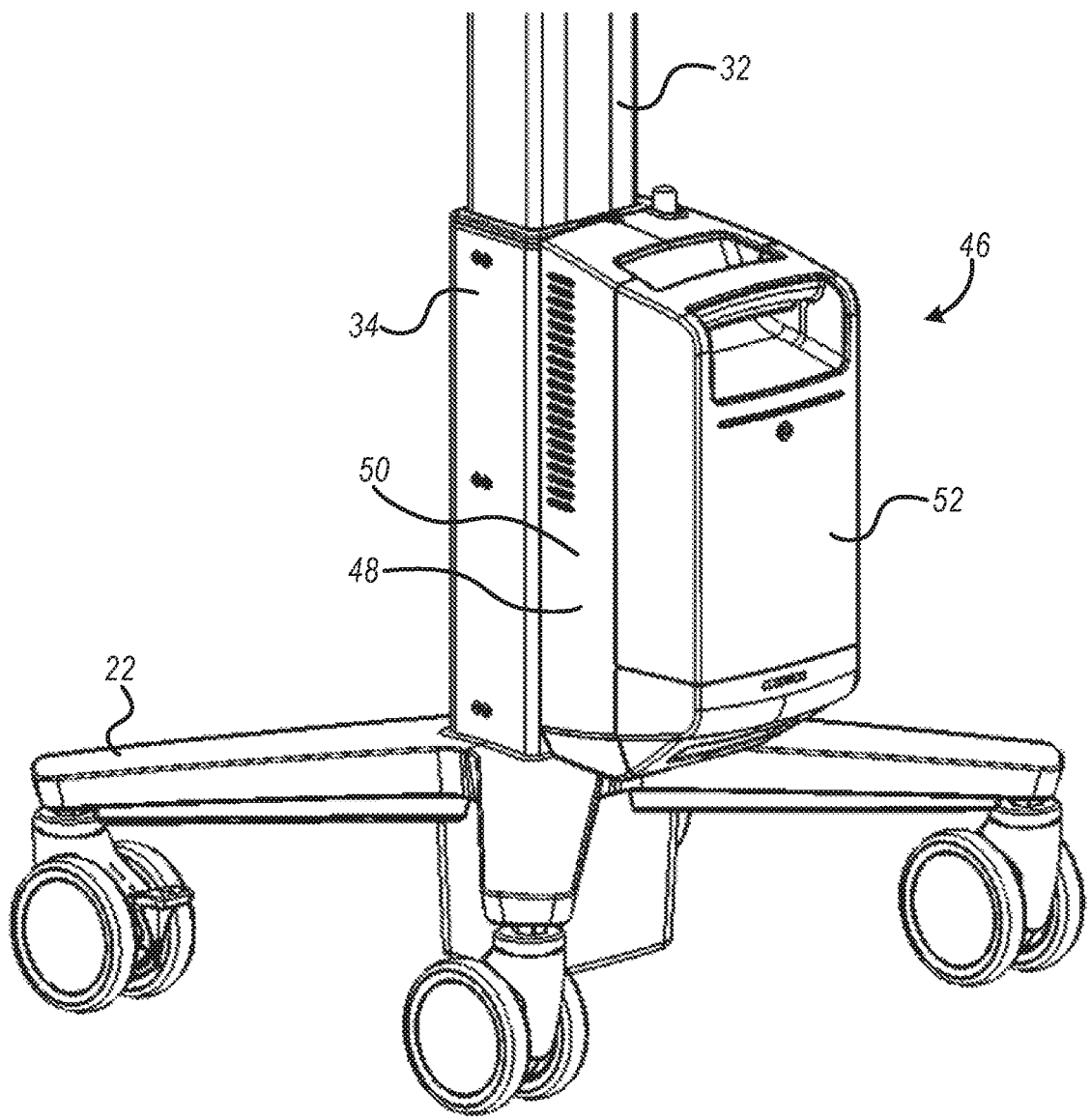
FIG. 3 is a perspective view of an example of the power system of the mobile workstation of FIG. 1.

FIG. 3 is a perspective view of an example of the power system of the mobile workstation 20 of FIG. 1. The power system of the mobile workstation 20 can include the battery assembly 46, e.g., connected to the third member 34, and the resident battery assembly 48, e.g., coupled to the base 22. The replaceable battery assembly 52 can include a battery connection housing 50 and a replaceable battery 52.

Figure 4:
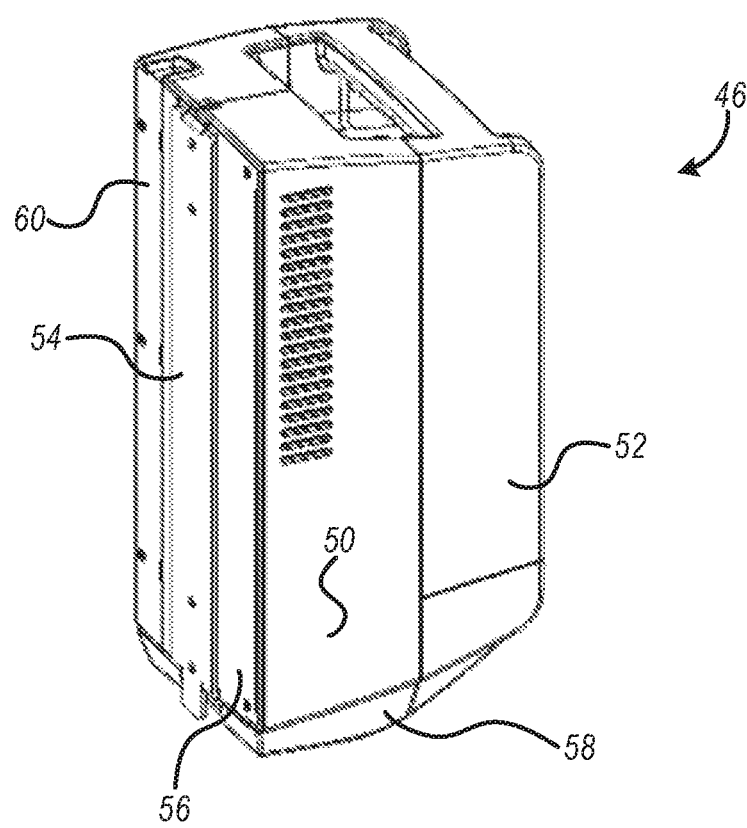
FIG. 4 is a perspective rear view of an example of a battery assembly including an attachment bracket.

FIG. 4 is a perspective rear view of an example of the battery assembly 46 including an attachment bracket 54. As seen in FIG. 4, the attachment bracket 54, which can allow the battery assembly to be attached to the telescoping column of the mobile workstation, e.g., the third member 34 of FIGS. 1-3, can be coupled to a portion of a back face 56 of the battery connection housing 50. The battery connection housing 50 can further include a bottom cover 58 and at least a portion of the housing 50 can define a cable routing channel 60 to allow various cables to extend from the power system to various electronic components coupled to the mobile workstation, e.g., computer and display.

Figure 5:
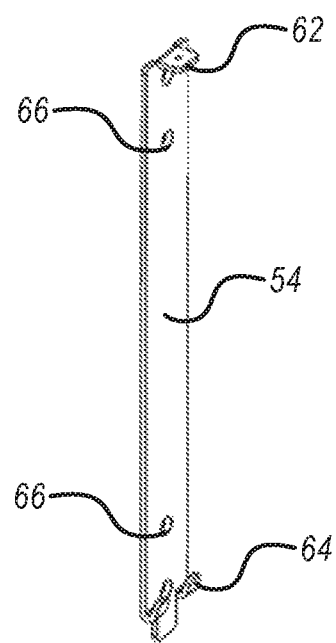
FIG. 5 is a perspective view of the attachment bracket of FIG. 4.

FIG. 5 is a perspective view of the attachment bracket 54 of FIG. 4. The attachment bracket 54 can include at least one upper tab 62 at an upper end of the bracket and at least one lower tab 64 at a lower end of the bracket. The attachment bracket 54 can define one or more holes 66 through which fasteners can extend to secure the bracket 54 to the riser 24 of FIG. 1.

Figure 6:
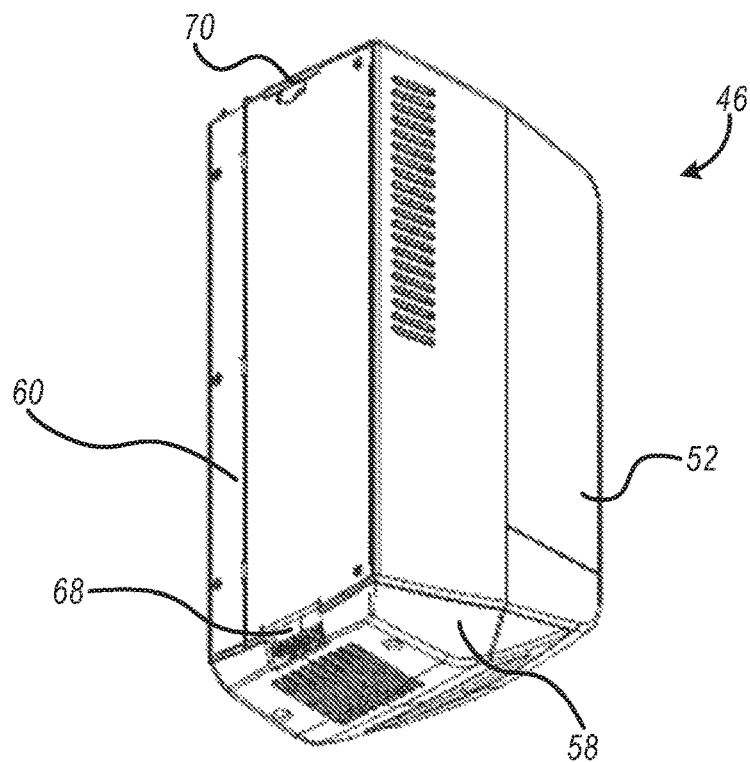
FIG. 6 is another perspective rear view of the battery assembly without the attachment bracket of FIG. 4.

FIG. 6 is another perspective rear view of the battery assembly 46 without the attachment bracket 54 of FIG. 4. The back face of the battery (shown at 56 in FIG. 4) can include a lower edge 68 proximate to a lower end of the back face and can define an upper slot 70 proximate to an upper end of the back face. The lower edge 68 can engage with the lower tab 64 of the attachment bracket 54 of FIG. 5, and the upper tab 62 of the attachment bracket 24 of FIG. 5 can be inserted into the upper slot 70. The battery assembly can further include a security screw (not depicted) that can be inserted through an aperture located on the upper surface of the battery housing, where the screw can couple with the upper tab 62 of the attachment bracket 54 of FIG. 5 to secure the battery housing on to the cart.

Figure 7:
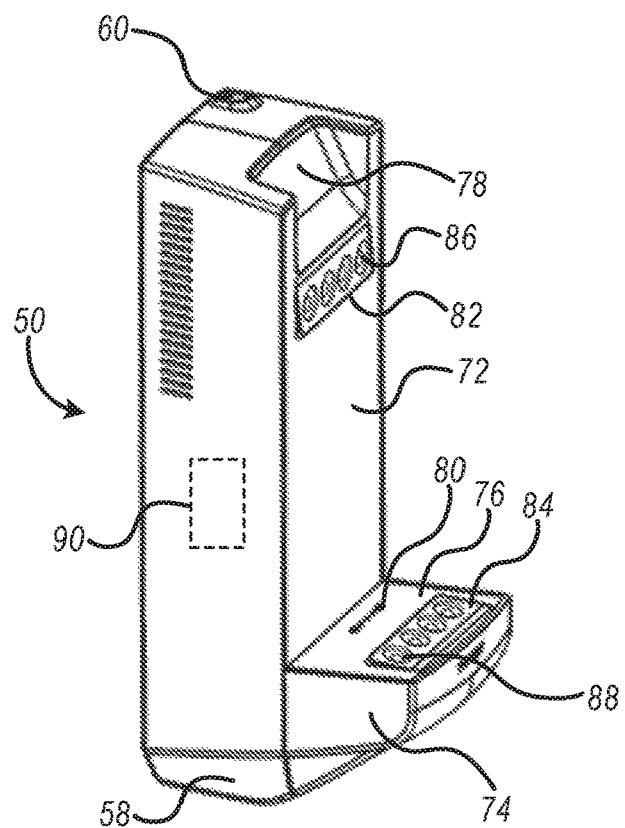
FIG. 7 is a perspective view of an example of the battery connection housing.

FIG. 7 is a perspective view of an example of the battery connection housing 50. In FIG. 7, the battery connection housing 50 can include a generally L-shaped side view or cross-section and can include a front face 72, e.g., a generally vertical face, and a shelf 74 having a shelf face 76 that can extend away from the front face 72, e.g., at an angle, such as a perpendicular, obtuse, or acute angle. The battery connection housing 50 can further define a recess 78 that can facilitate removal of the replaceable battery.

The battery connection housing 50 can further include several power connection pins 80 (or other connectors) to electrically couple the replaceable battery to the power system of the mobile workstation 20 using corresponding receptacles (or other connectors) on the replaceable battery.

Figure 8:
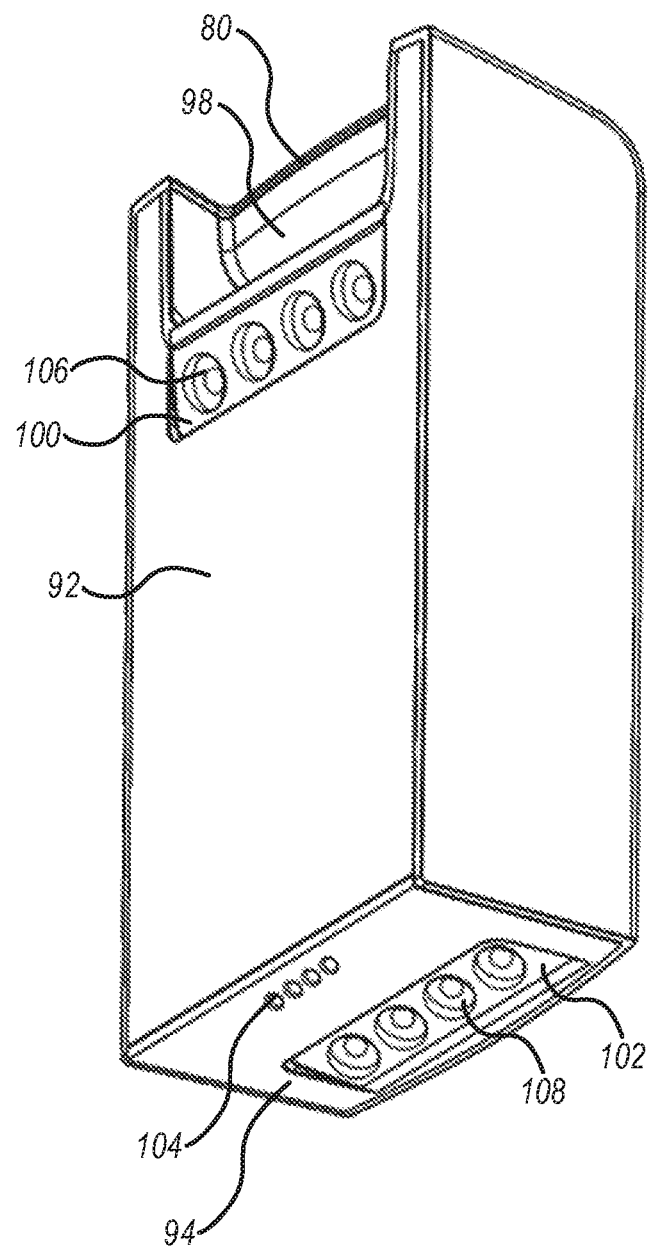
FIG. 8 is a perspective view of an example of the replaceable battery.

As mentioned above, the battery connection housing 50 and a replaceable battery. (e.g., replaceable battery 52 of FIG. 8 or replaceable battery 120 of FIG. 10) can include matching or complementary features, e.g., ridges and notches, that can allow the two to engage and mate with one another. In FIG. 7, a raised portion, shown as a first ridge 82, extends away from the front face 72. Similarly, another raised portion, shown as a second ridge 84, extends away from the shelf face 76. The first ridge 82 and the second ridge 84 can couple with corresponding features in the replaceable battery, e.g., notches, recessed portions or indentations. In some example configurations, such as shown in FIGS. 7 and 8, the ridges 82, 84 are fixed, raised portions and do not retract. The first and second ridges are also referred to in this disclosure as "raised portions."

The first and second ridges 82, 84 can be raised portions that can have shapes and heights that are complementary to the shapes and depths of first and second notches (recessed portions), respectively, e.g., first and second notches 100, 102 of FIG. 8, In some example implementations, the raised portions 82, 84 can have a height in a range of about 2 millimeters (mm) to about 10 mm. As seen in the example configuration shown in FIG. 7, the first and second ridges 82, 84 can have a generally rectangular shape, e.g., about 20 mm by about 80 mm. However, the first and second ridges 82, 84 are not limited to a rectangular shape. Rather, the first and second ridges 82, 84 can be selected from numerous geometric shapes, including, but not limited to, square, trapezoidal, oval, and circular.

In addition, in some example configurations, the first and second ridges 82, 84 need not have the same shape. For example, the first ridge 82 and a first notch can have a generally rectangular shape and the second ridge 84 and a second notch can have a generally oval shape.

In some example implementations, such as shown in FIG. 7, one or both of the first ridge 82 and the second ridge 84 can be angled such that a back edge is raised more than a front edge. For example, a back edge of the second ridge 84 (the edge closest the front face 72) can have a height greater than the front edge of the second ridge 84 (the edge opposite the back edge). In other implementations, the ridges 82, 84 need not be angled.

As mentioned above, in some example configurations, one or both of the battery connection housing 50 and replaceable battery 52 can include one or more magnets to magnetically latch or secure the replaceable battery 52 to the battery connection housing 50, In FIG. 7, the covers on each of the first ridge 82 and the second ridge 84 have been removed to show the upper receiving magnets 86 and the lower receiving magnets 88 positioned within the first ridge 82 and the second ridge 84, respectively. For example, the upper receiving magnets 86 and the lower receiving magnets 88 can be molded or formed into the first ridge 82 and the second ridge 84, respectively.

Although each of the upper receiving magnets 86 and the lower receiving magnets 88 are shown including four magnets in FIG. 7, more than four magnets or less than four magnets can be used. In some example configurations, the upper receiving magnets 86 and the lower receiving magnets 88 can be high strength magnets, e.g., neodymium magnets.

The battery connection housing 50 can include a power module 90, e.g., located inside the generally vertical portion, in electrical communication with the replaceable battery 52 and the resident battery 48. As shown below in FIG. 15, the power module 90 can include an AC/DC power supply, a controller logic circuit (also referred to as a "controller"), a battery charging circuit, an inverter, and a wireless communication circuit, e.g., Wi-Fi module or other protocols including but not limited to LoRa, Z-Wave, cellular, and Bluetooth. The wireless communication circuit can wirelessly send data collected from the power system operation to a control board.

The power system can operate in two modes to power up any electronic devices electrically connected to the mobile workstation: 1) hot swap mode; and 2) charging mode. These modes of operation are selectable by the user.

In the hot swap mode of operation, the replaceable battery 52 can be used to power up any electronic devices electrically connected to the power system of the mobile workstation. When the replaceable battery 52 is connected to the workstation 20 via the battery connection housing 50, it can recharge the resident battery, e.g., resident battery 48 of FIG. 1, and can also provide power to any electronic devices coupled to the workstation.

When the capacity of the replaceable battery is depleted, e.g., below a threshold level, the power module 90, the controller logic circuit, can switch the power supply from the replaceable battery to the resident battery 48. When the capacity remaining in the resident battery drops down to a first level, the power system can issue a warning to the user to substitute the replaceable battery with a fully charged one, and the power system can initiate a battery substitution timer. For example, the power system can generate an audible tone or other message using a speaker coupled to the power system, or can generate a visual message using a display, e.g., UI display 314 of FIG. 15, and/or other visual indicators, blinking lights or light emitting diodes (LEDs) coupled to the power system. In some example implementations, the substitution timer can begin as soon as the replaceable battery is removed regardless of the capacity remaining in the resident battery.

When the replaceable battery 52 is removed from the workstation during a substitution of the replaceable battery 52, the power module 90 can switch the supply of power from the replaceable battery 52 to the resident battery 48 to provide uninterrupted power to the electronic devices coupled to the workstation. After substitution, the power module 90 can switch the supply of power from the resident battery 48 to the newly substituted replaceable battery 52 to provide uninterrupted power to the electronic devices coupled to the workstation and to charge the resident battery 48.

If, however, the replaceable battery 52 is not substituted with another replaceable battery prior to the expiration of the substitution timer and the capacity, in the replaceable battery 52 is depleted, then the power supply to the electronic devices is shut off. In some examples, when the replaceable battery is removed, the expiration timer can be triggered if/once the capacity remaining in the resident battery drops down to a first level.

In the charge mode of operation, the replaceable battery 52 can remain coupled to the battery connection housing 50 indefinitely. Power can be provided to the electronic devices coupled to the workstation from the replaceable battery 52. When the capacity of the replaceable battery 52 drops down to a threshold level, the power system can issue a warning to the user to charge the replaceable battery 52 located on the cart. For example, the power system can generate an audible tone or other message using a speaker coupled to the power system, or can generate a visual message using indicators, e.g., blinking lights or light emitting diodes (LEDs) coupled to the power system. An external power cord can be attached to the power system and plugged in to a mains power supply to charge the replaceable battery 52. In some examples, when the system is plugged into the wall it will charge the replaceable battery and resident battery simultaneously.

FIG. 8 is a perspective view of an example of the replaceable battery 52, The replaceable battery 52 can include a rear face 92, a front face opposite the rear face 92, a bottom face 94, and a top face opposite the bottom face 94. In some examples, the replaceable battery can include a handle 96, e.g., formed into the top face, and partially define a handle opening 98 under the handle 96.

The rear face 92 can define a first notch 100. The size and shape of the first notch 100 can be complementary to the size and shape of the first ridge 82 of the battery connection housing 50 to allow the first notch 100 and the first ridge 82 to join together or engage with one another, e.g., as keyed connectors. The bottom face 94 of the replaceable battery 52 can define a second notch 102 or recessed portion. The size and shape of the second notch 102 can be complementary to the size and shape of the second ridge 84 of the battery connection housing 52 to allow the second notch 102 and the second ridge 84 to join together or engage with one another, e.g., as keyed connectors. The first and second notches are also referred to in this disclosure as "recessed portions."

The first and second notches 100, 102 can be recessed portions that can have shapes and depths that are complementary to the shapes and heights of the first and second ridges 82, 84, respectively. In some example implementations, the recessed portions can have a depth in a range of about 2 mm to about 10 mm. As seen in the example configuration shown in FIG. 8, the first and second notches 102, 104 can have a generally rectangular shape. However, the first and second notches 100, 102 are not limited to a rectangular shape. Rather, the first and second notches 100, 102 can be selected from numerous geometric shapes, including, but not limited to, square, trapezoidal, oval, and circular.

In some example implementations, such as shown in FIG. 7, one or both of the first ridge 82 and the second ridge 84 can be angled such that a back edge extends more than a front edge. For example, a back edge of the second ridge 84 (the edge closest the front face 72) can have a height greater than the front edge of the second ridge 84 (the edge opposite the back edge). In other implementations, the ridges 82, 84 need not be angled.

In some example implementations, such as shown in FIG. 8, one or both of the first notch 100 and the second notch 102 can be angled such that a back edge extends more than a front edge. For example, a back edge of the second notch 102 (the edge closest the rear face 92) can be recessed more than the front edge of the second notch 102 (the edge opposite the back edge). In other implementations, the notches 100, 102 need not be angled.

The replaceable battery 52 can further include several power connection receptacles 104 (or other connectors) to electrically couple the replaceable battery to the power system of the mobile workstation using the corresponding connection pins on the replaceable battery connection housing. When the replaceable battery 52 is attached to the battery connection housing 50, the battery connection pins 80 located on the battery connection housing 50 are inserted into the battery connection receptacles 104 located on the replaceable battery 52, and a power is provided to the power module 90 from the replaceable battery 52.

In the example configuration shown in FIG. 8, the covers on each of the first notch 100 and the second notch 102 have been removed to show the upper connection magnets 106 positioned within the first notch 100 and lower connection magnets 108 positioned within the second notch 102, respectively. For example, the upper connection magnets 106 and the lower connection magnets 108 can be molded or formed into the first notch 100 and the second notch 102, respectively.

Although each of the upper connection magnets 106 and the lower connection magnets 108 are shown including four magnets in FIG. 8, more than four magnets or less than four magnets can be used. In some example configurations, the upper connection magnets 106 and the lower connection magnets 108 can be high strength magnets, e.g., neodymium magnets.

It should be noted that in some example implementations, the replaceable battery 52 or the battery connection housing 50 can include a ferromagnetic material rather than magnets. For example, either the upper connection magnets 106 of the replaceable battery 52 or the upper receiving magnets 86 of the battery connection housing 50 can be replaced by a ferromagnetic material(s). Similarly, either the lower connection magnets 108 of the replaceable battery 52 or the lower receiving magnets 88 of the battery connection housing 50 can be replaced by a ferromagnetic material(s). In this manner, magnet(s) and ferromagnetic material(s) can be paired together instead of pairing sets of magnets together.

When the replaceable battery 52 is attached to the battery connection housing 50, the first ridge 82 is positioned at least partially within the first notch 100, and the second ridge 84 is positioned at least partially within the second notch 102. Because at least a portion of the height of the ridges 82, 84 is positioned within the notches 100, 102, respectively, the replaceable battery 52 can securely mate with the battery connection housing 50 and prevent separation in the event of an accidental side impact on the replaceable battery 52, for example.

Figure 9:
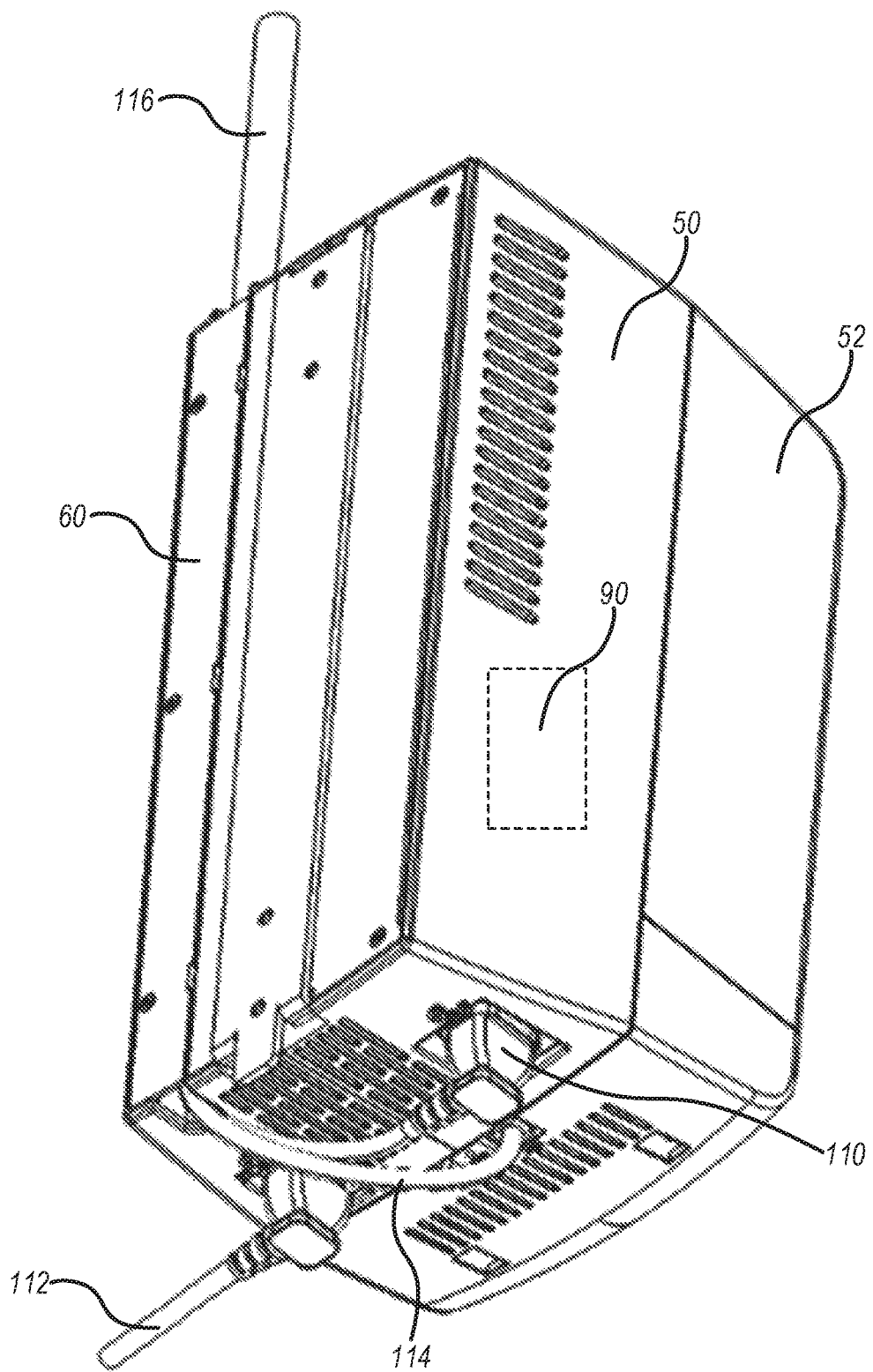
FIG. 9 is a perspective view of the battery assembly of FIG. 1.

FIG. 9 is a perspective view of the battery assembly 46 of FIG. 1. The power module 90 located inside the battery connection housing 50 can include two power ports and a data communication port. The two power ports of the power module 90 receive power from the device power cord 110 and the battery charging cord 112. The data communication port of the power module 90 is coupled to a data cable 114 located proximate the bottom surface of the battery connection housing 50.

The bottom surface of the battery connection housing 50 can include first and second power connectors and a data connector to receive the power and charging cords and the data cable. As seen in FIG. 9, the data cable and power cord can be bundled together, as shown at 116, and routed to the head unit assembly 26 of FIG. 1, for example.

The battery charging cord 112 can be attached to a first power connector to charge the replaceable battery 52 when it is connected to the battery connection housing 50. One end of the battery charging cord 112 can be connected to the first power connector, and the other end of the battery charging cord 112 can be connected to the mains power supply, such as a wall outlet.

The device power cord 110 can be attached to the second power connector. The device power cord 110 can be routed through the cable routing channel 60 and can extend up to the head unit assembly 26 of FIG. 1. One end of the device power cord 110 can be connected to the second power connector and the other end can include at least one receptacle to receive a power connector of an electronic device, e.g., computing device or electronic display.

The data cable 114 can be attached to the data communication port and can be routed through the cable routing channel 60 of FIG. 4 and can extend to the head unit assembly 26 of FIG. 1, for example. One end of the data cable 114 can be connected to the data communication port and the other end of the data cable 114 can be connected to a computing device or to a user interface to transfer battery usage information further processing or to display to the user.

Figure 10:
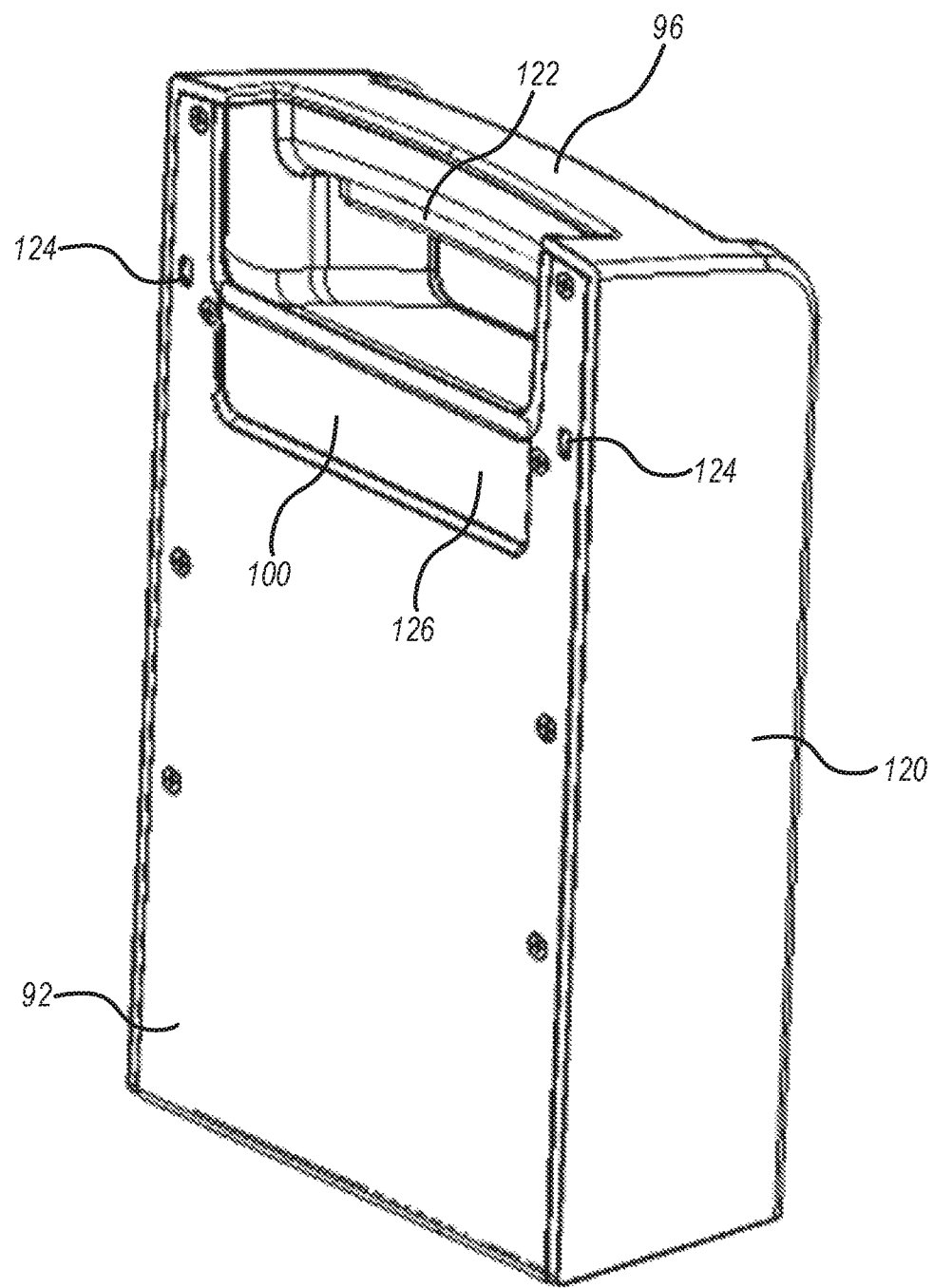
FIG. 10 is a perspective view of another example of a replaceable battery.

FIG. 10 is a perspective view of another example of a replaceable battery. The replaceable battery 120 of FIG. 10 can include some features similar to those shown in FIG. 8. For purposes of conciseness, similar features will not be described again. The replaceable battery 120 can include a button 122, e.g., an elongated depressible button positioned underneath the handle 96. The button 122 can be mechanically coupled to one or more push pins 124, e.g., located on the rear side of the replaceable battery.

In some example implementations, the push pins 124 can be spring loaded and biased towards the inside of the replaceable battery 120. When a user depresses the button 122, the push pins 124 can extend outwardly, away from the rear face 92 of the replaceable battery. When the replaceable battery 120 is coupled together with the battery connection housing 50, the rear face 92 is flush against the front face 72 of the battery connection housing 50 such that the push pins 124 press against the front face 72 and push the replaceable battery 120 away from the battery connection housing 50. The extension of the push pins 124 can separate the upper connection magnets (below a cover 126) from upper receiving magnets and disengage the first ridge from the first notch 100. Then, user can easily lift the replaceable battery 120 from the battery connection housing 50.

Figure 11:
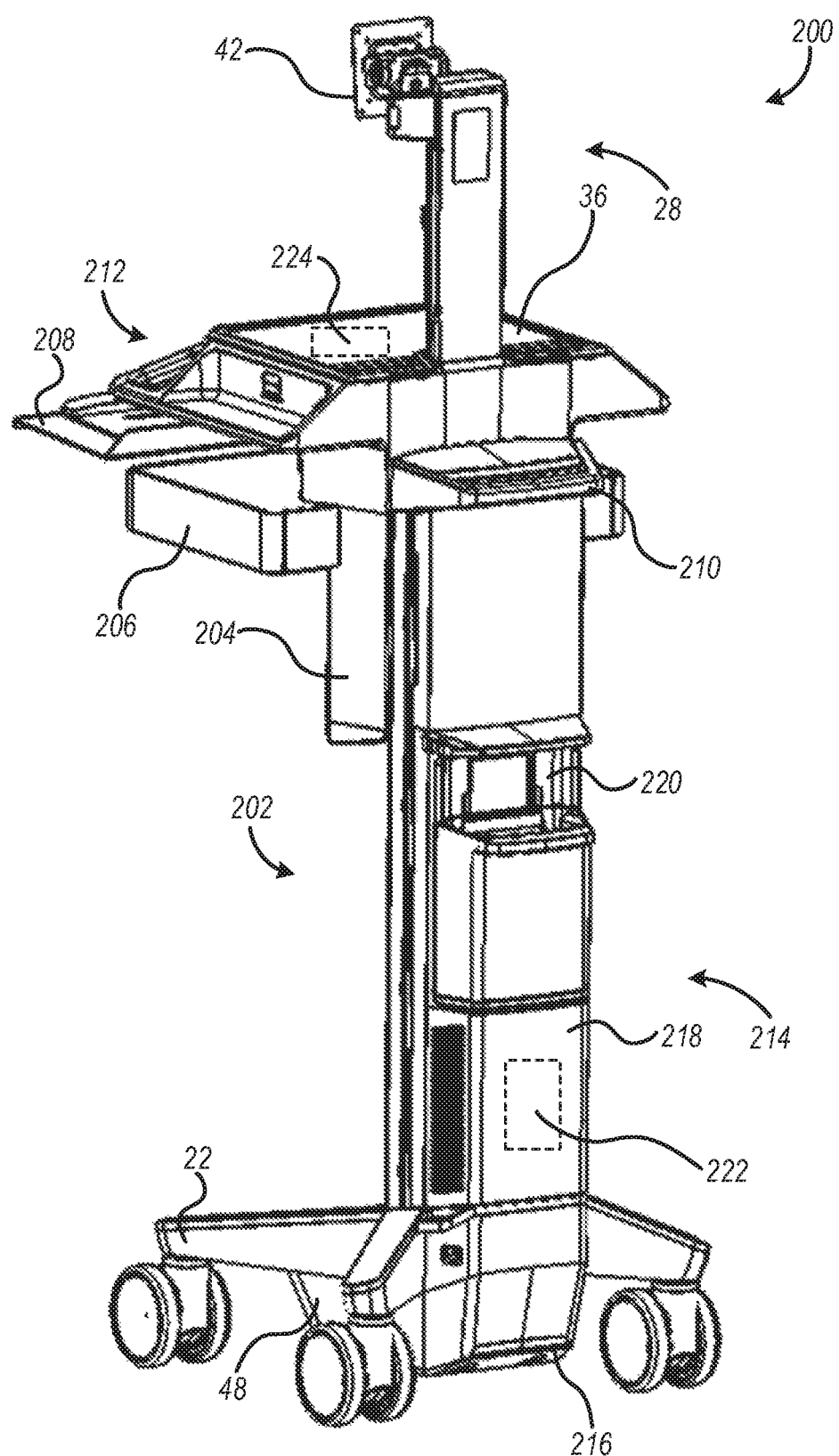
FIG. 11 is a perspective view of another example of a mobile workstation including a power system that can implement various techniques of this disclosure.

FIG. 11 is a perspective view of another example of a mobile workstation including a power system that can implement various techniques of this disclosure. The mobile workstation 200 of FIG. 11 can include some features similar to those shown in FIG. 1. For purposes of conciseness, similar features will not be described again.

In contrast to the telescoping head unit riser 24 shown in FIG. 1, the mobile workstation 200 shown in FIG. 11 includes a fixed-height head unit riser 202, or stationary riser. The mobile workstation 200 of FIG. 11 can further include an IT housing 204 to retain one or more cables and power connectors (e.g., a power outlet strip), a drawer housing 206, and a keyboard tray 208. In some example configurations, the mobile workstation 200 can include a handle 210 to facilitate transport of the workstation.

A moving bracket (not shown) can be slidably attached to the head unit riser 202. The head unit assembly 212, display riser 28, and the IT housing 204 can be connected to the moving bracket. A user can selectively adjust the height of the moving bracket, and thus adjust the height of the head unit assembly 212.

The power system 214 of the mobile workstation 200 can include a resident battery 48, e.g., located inside a housing 216 attached to the base 22. A power module housing 218 and a battery connection housing 220 can be attached to a rear side of the head unit riser 202. A power module 222 can be located inside the power module housing 218, e.g., inside a vertical portion of the power module housing 218.

The power module 222 can include an AC/DC power supply, an inverter, a controller logic circuit (also referred to as a "controller"), and battery charging circuit, a block diagram of which being shown below in FIG. 17. The replaceable battery, e.g., replaceable battery 52 of FIG. 8 or replaceable battery 120 of FIG. 10, and the power module 222 can be in electrical communication with each other when the replaceable battery is attached to the battery connection housing 220. The replaceable battery can be removably attached to the battery connection housing 220, as described above with respect to battery connection housing 50.

The power module 222 can communicate power system data and battery data via an electrical data bus to a centralized cart control system 224 in the head unit assembly 212. The cart control system 224 can be coupled to a wireless communication module or circuit 312 of FIG. 17, e.g., WiFi module, configured to communicate information, e.g., battery data, wirelessly to a network device connected to a network, e.g., an intranet and/or the Internet.

Figure 12:
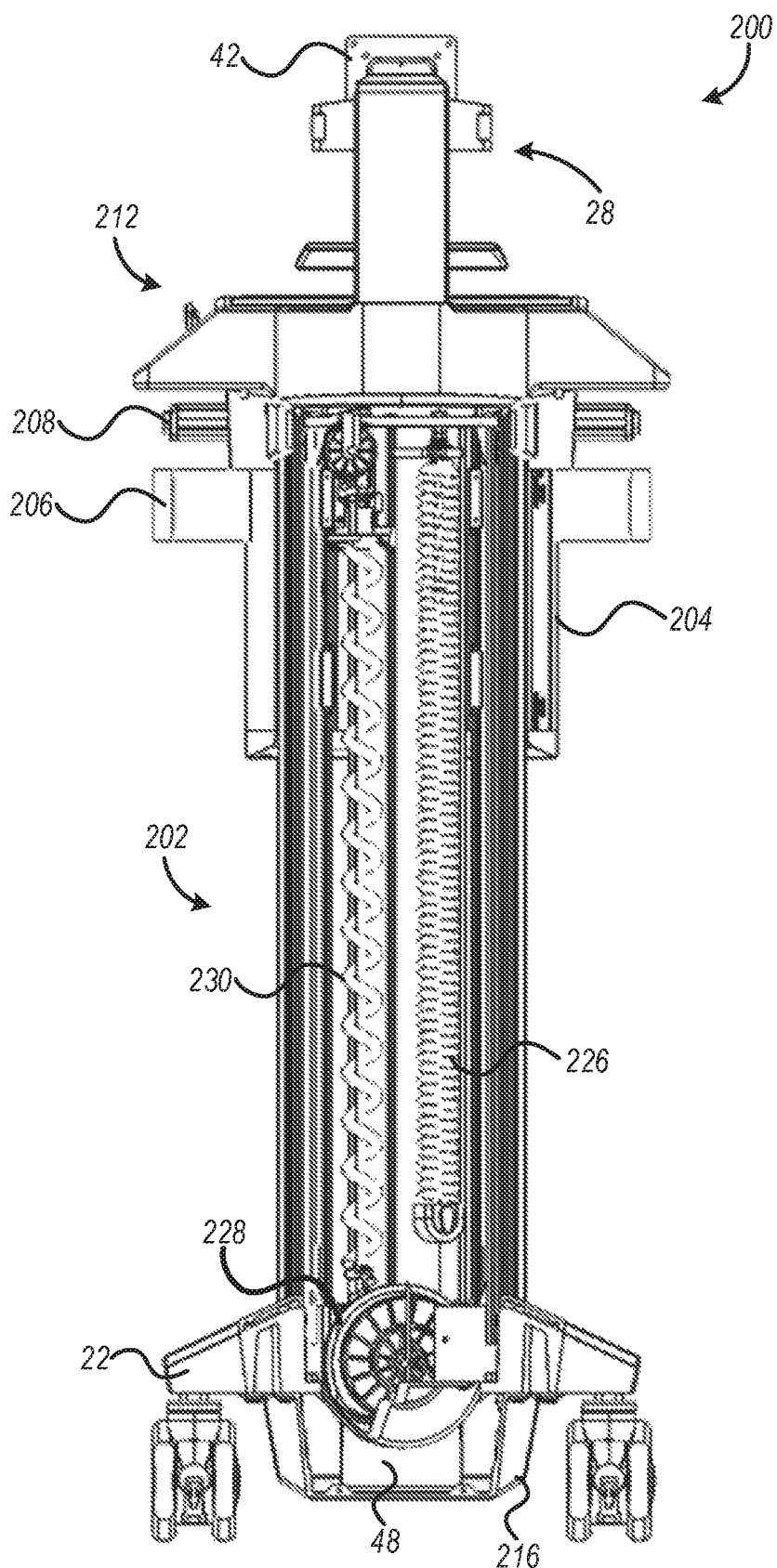
FIG. 12 is a partial rear cutaway view of the mobile workstation of FIG. 11.

FIG. 12 is a partial rear cutaway view of the mobile workstation 200 of FIG. 11. As seen in FIG. 12, the head unit riser 202 can include a counterbalance mechanism having an energy storage member 226, e.g., an extension spring, and a cam/wheel assembly 228. The counterbalance mechanism can be operatively connected to the head unit riser 202 and to the moving bracket, and can provide a counterbalance lift force for at least a portion of the weight attached to the head unit assembly throughout the height adjustment.

In the example shown in FIG. 12, a coiled power cord 230 can be located inside the head unit riser 202. One end of the coiled cord 230 can be connected to the power system 214 and the other end of the coiled cord 230 can be connected to an outlet strip, e.g., located inside the head unit assembly 212. The coiled cord 230 can expand and contract during the height adjustment of the head unit riser 202 and can provide power to various electronic devices electrically connected to the head unit assembly, e.g., computing devices and electronic displays. The coiled cord 230 can also facilitate data transfer from the power module to the cart control system. For example, the coiled cord can include a separate data cable to facilitate the data bus. In other implementations, the data can be transferred on the power wires directly.

Figure 13:
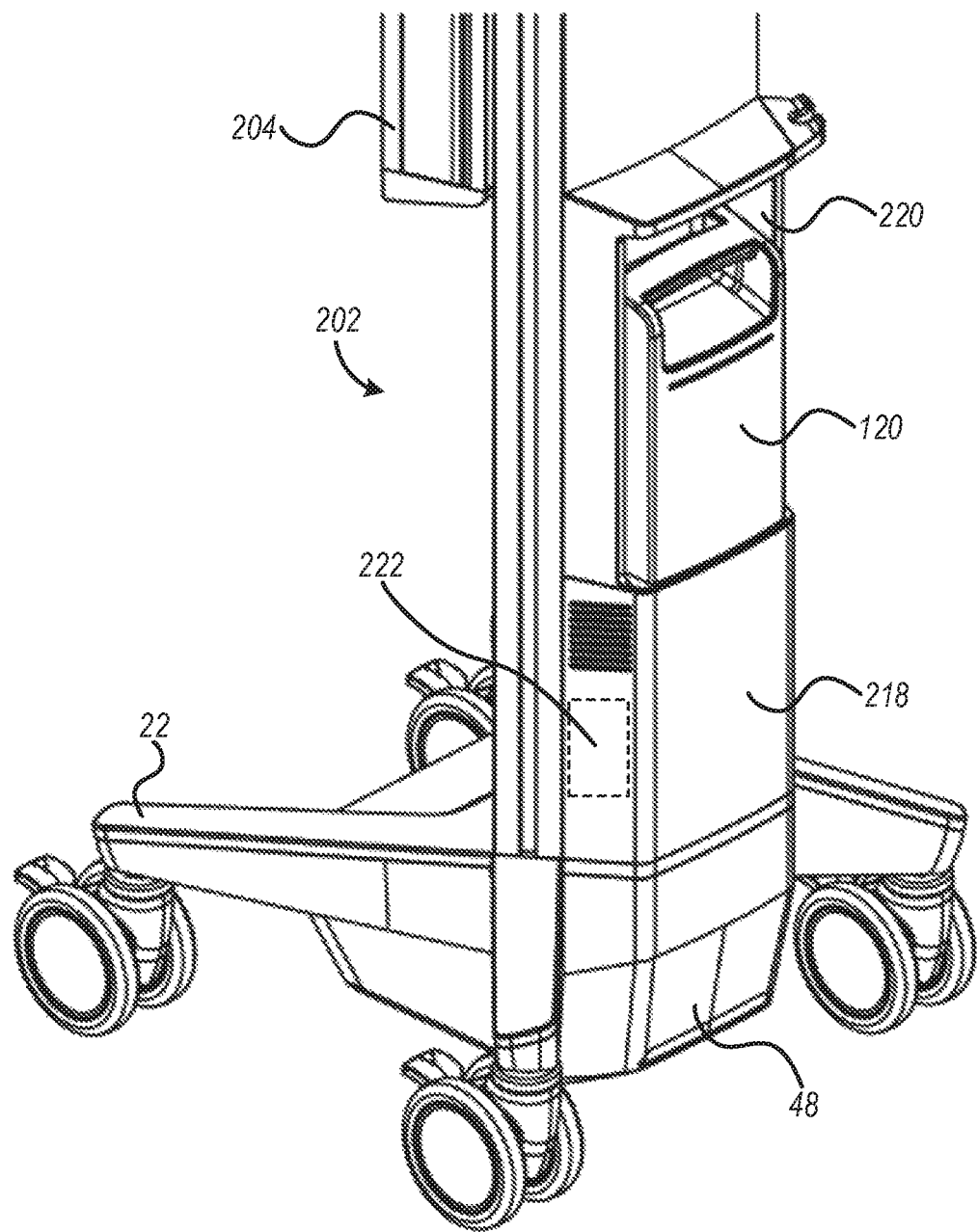
FIG. 13 is a perspective view of an example of the power system of the mobile workstation of FIG. 11.

FIG. 13 is a perspective view of an example of the power system of the mobile workstation 200 of FIG. 11. The power system of the mobile workstation 200 can include a replaceable battery, e.g., replaceable battery 52 of FIG. 8 or replaceable battery 120 of FIG. 10, coupled to the battery connection housing 220, the power module housing 218 including the power module 222, and the resident battery assembly 48, e.g., coupled to the base 22.

Figure 14:
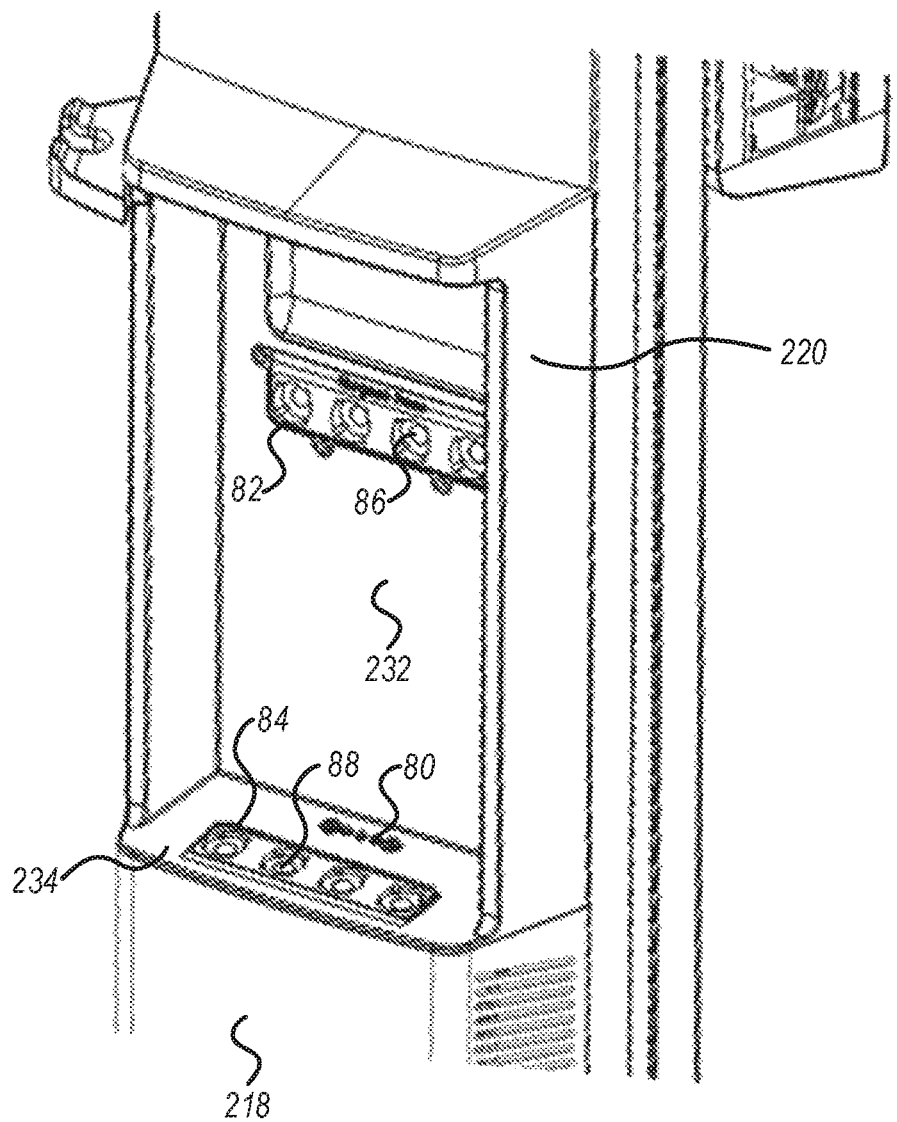
FIG. 14 is a perspective view of an example of the battery connection housing.

FIG. 14 is a perspective view of an example of the battery connection housing 220. The battery connection housing 220 can include a first face 232, e.g., a generally vertical face, and a second face 234 that can extend away from the first face 232, e.g., at an angle, such as a perpendicular, obtuse, or acute angle.

The battery connection housing 220 can further include several power connection pins 80 to electrically couple the replaceable battery to the power system of the mobile workstation using corresponding receptacles on the replaceable battery. The battery connection housing 220 can be in the power module 222 of FIG. 13.

Similar to what was described above, the battery connection housing 222 and a replaceable battery, (e.g., replaceable battery 52 of FIG. 8 and replaceable battery 120 of FIG. 10) can include matching or complementary features, e.g., ridges and notches, that allow the two to engage and mate with one another. In FIG. 14, a raised portion, shown as a first ridge 82, extends away from the first face 232. Similarly, another raised portion, shown as a second ridge 84, extends away from the second face 234. The first ridge 82 and the second ridge 84 can couple with corresponding features in the replaceable battery, e.g., notches or indentations.

In some example implementations, such as shown in FIG. 11, one or both of the first ridge 82 and the second ridge 84 can be angled such that a back edge extends more than a front edge. For example, a back edge of the second ridge 84 (the edge closest the first face 232) extends away from the second face 234 more than the front edge of the second ridge 84 (the edge opposite the back edge). In other implementations, the ridges 82, 84 need not be angled.

As mentioned above, in some example configurations, one or both of the battery connection housing 220 and replaceable battery 52 can include one or more magnets to magnetically latch or secure the replaceable battery 52 to the battery connection housing 220. In FIG. 14, the covers on each of the first ridge 82 and the second ridge 84 have been removed to show the upper receiving magnets 86 and the lower receiving magnets 88 positioned within the first ridge 82 and the second ridge 84, respectively. For example; the upper receiving magnets 86 and the lower receiving magnets 88 can be molded or formed into the first ridge 82 and the second ridge 84, respectively.

Although each of the upper receiving magnets 86 and the lower receiving magnets 88 are shown including four magnets in FIG. 11, more than four magnets or less than four magnets can be used. In some example configurations, the upper receiving magnets 86 and the lower receiving magnets 88 can be high strength magnets, e.g., neodymium magnets.

The power system can operate in two modes to power up any electronic devices electrically connected to the mobile workstation: 1) hot swap mode; and 2) a "charge on cart" mode. These modes of operation are selectable by the user.

In the hot swap mode of operation, the replaceable battery 52 can be used to power up any electronic devices electrically connected to the power system of the mobile workstation. When the replaceable battery 52 is connected to the workstation 200 via battery connection housing 220, it can recharge the resident battery, e.g., resident battery 48 of FIG. 13, if the resident battery is below a threshold level, and can also provide power to any electronic devices.

When the capacity in the replaceable battery is depleted, e.g., a maximum capacity that when removed from the battery will not damage the battery or create an unsafe condition, the power module, e.g., the controller logic circuit, can switch the power supply from the replaceable battery to the resident battery 48 to provide uninterrupted power to any electronic devices coupled to the workstation. When the capacity remaining in the resident battery 48 drops to a threshold level, the power system can issue a warning to the user to substitute the replaceable battery with a fully charged one, and the power system can initiate a battery substitution timer. For example, the power system can generate an audible tone or other message using a speaker coupled to the power system, or can generate a visual message using indicators, e.g., blinking lights or light emitting diodes (LEDs) coupled to the power system, e.g., user interface display 314 of FIG. 17.

If the replaceable battery is not substituted with another replaceable battery prior to the expiration of the substitution timer, then the power supply to the electronic devices is shut off. The system will shut down once the battery 48 reaches a threshold level. The threshold level can be determined by the minimum capacity that the replaceable battery can recharge the resident battery and by the minimum duration that the resident battery must provide power during substitution. For example, it can be between 5%-15% of full capacity.

In the charge mode of operation, the replaceable battery 120 can be normally coupled to the battery connection housing 220, which, in combination with the resident battery 48 can increase the battery capacity of the workstation. Power can be provided to the electronic devices coupled to the workstation, e.g., computing devices and electronic displays, from whichever battery has a higher charge level. Once the charge level on each battery is equal, the electronic devices can receive power from each battery simultaneously. When the capacity of either battery drops to a threshold level, the power system can issue a warning to the user that the cart shall be plugged in to charge both batteries. For example, the power system can generate an audible tone or other message using a speaker coupled to the power system, or can generate a visual message using indicators, e.g., blinking lights or light emitting diodes (LEDs) coupled to the power system.

An external power cord can be attached to the power system on one end, and plugged in to a mains power supply to charge both batteries. If power from both batteries is depleted then power to the electronic devices is shut off.

In some example implementations, the cart control system can automatically select the above modes of operation. For example, the cart control system 224 of FIG. 11 can monitor a frequency at which the removable battery is removed, e.g., once a week, and a frequency that the cart is plugged in to charge, e.g., once a week. Based on this data, the cart control system can select the best mode of operation for the end user. In other example implementations, the power module 222 itself can automatically select the above modes of operation using a similar methodology.

Figure 15:
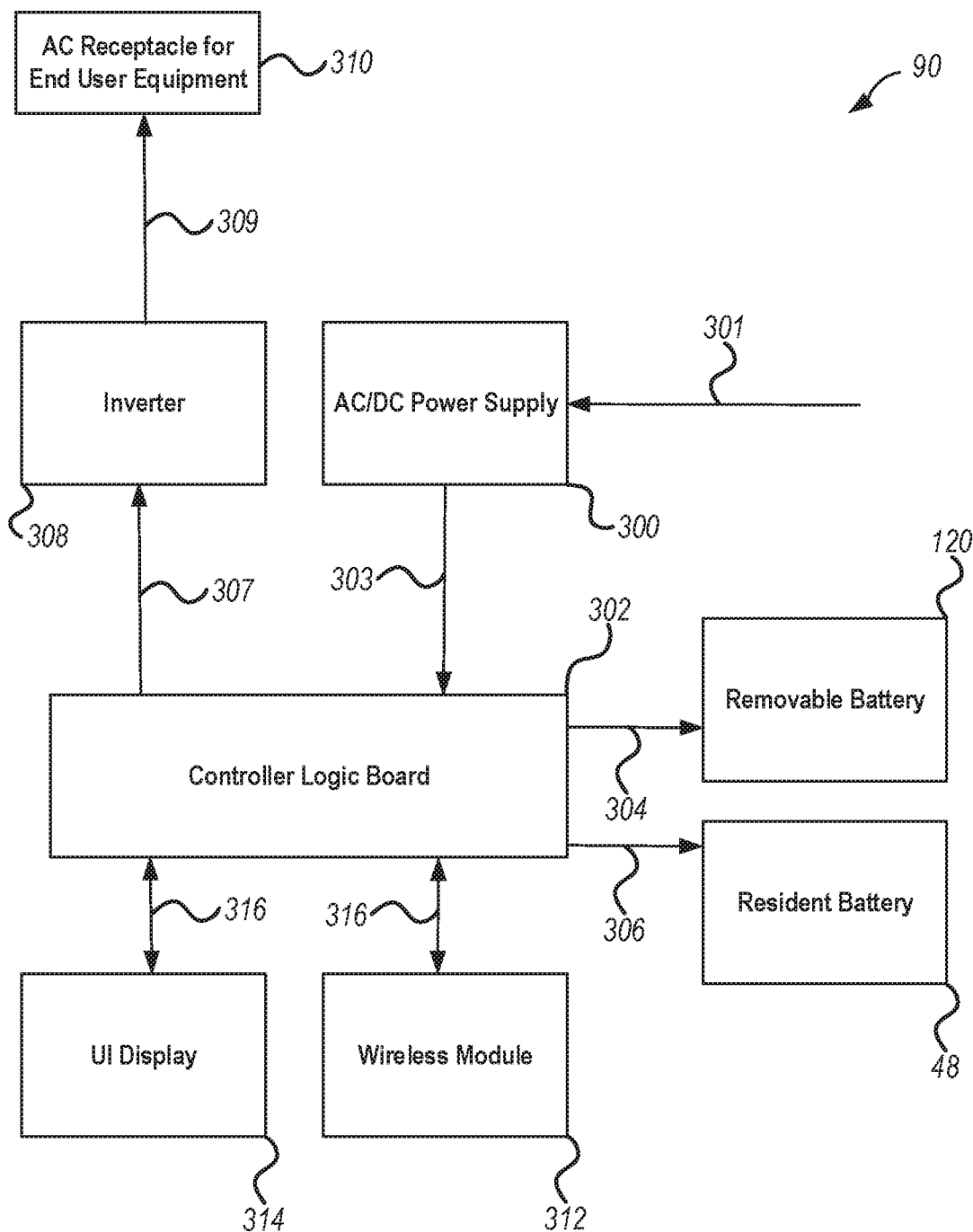
FIG. 15 is an example of a block diagram of the power module of FIG. 7 during system charging.

FIG. 15 is an example of a block diagram of the power module 90 of FIG. 7 during system charging. The AC/DC power supply 300 can receive AC power 301 and output DC power 303 to the controller logic board 302. The controller logic board 302 (or "controller") can include charging circuitry configured to provide a first charge current 304 to the removable battery 120 (or removable battery 52) and a second charge current 306 to the resident battery 48. In addition, the controller 302 can output DC power 307 to an inverter 308 to supply power 309 to one or more AC receptacles 310 in the head unit assembly 26.

The power module 90 can further include a wireless communication circuit 312, e.g., Wi-Fi module, and a user interface display 314. The controller 302 can communicate data 316, e.g., battery data, to and receive data from the wireless communication circuit 312 and display the data, e.g., battery data, using the user interface display 314. Battery data information can include but is not limited to: remaining capacity, current, pack voltage, individual cell voltages, temperature, remaining time, cycle count, battery state of health, serial number, and fault codes.

Figure 16:
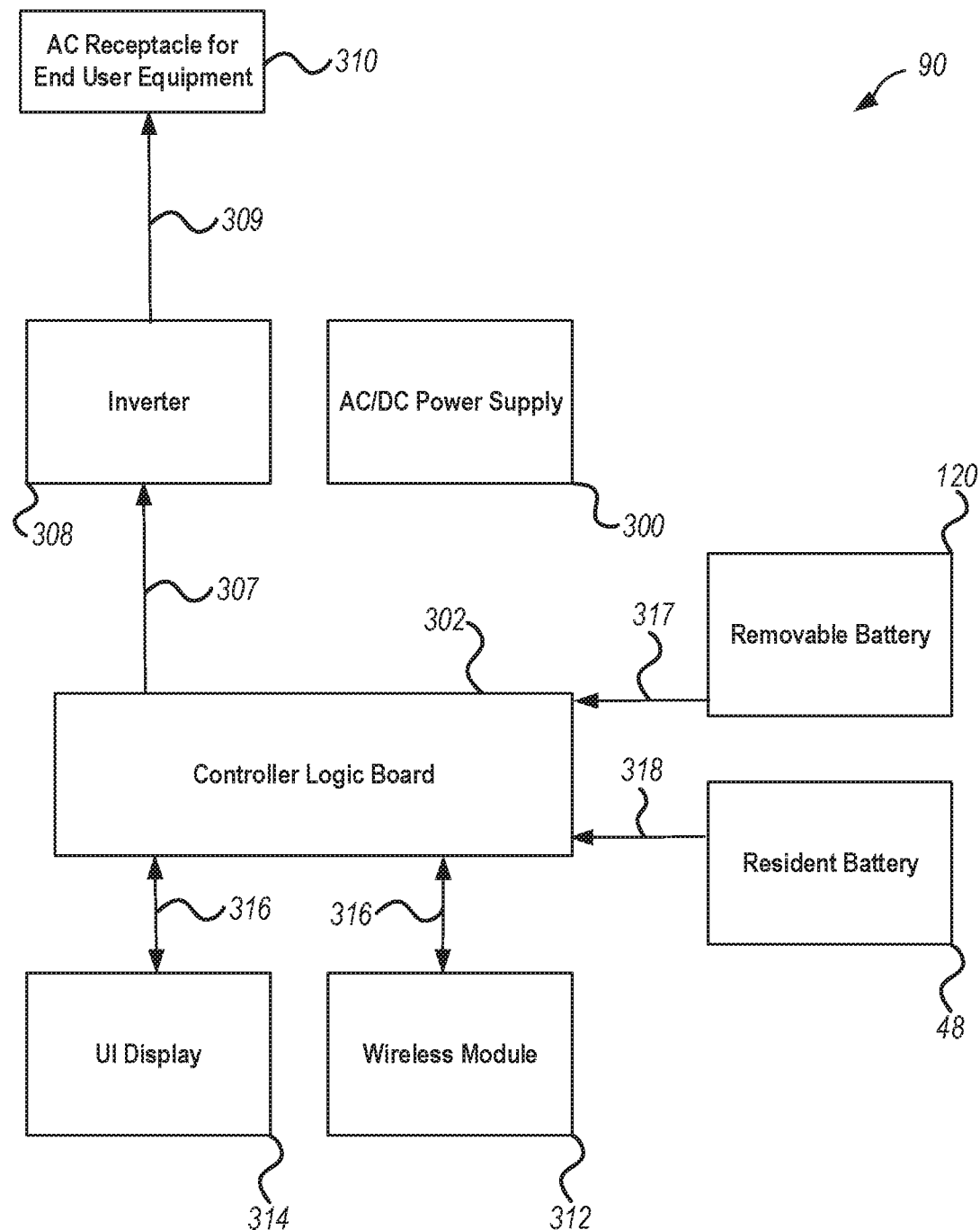
FIG. 16 depicts the block diagram of FIG. 15 during system discharging.

FIG. 16 depicts the block diagram of FIG. 15 during system discharging. As seen in FIG. 16, after the AC power input to the AC/DC power supply 300 has been removed, either the removable battery 120 or the resident battery 48 can supply battery current 317, 318, respectively, to the controller 302. For example, if the removable battery 120 is not present (or sufficiently depleted), the resident battery 48 can provide battery current 318 to the controller 302. The controller 302 can receive the battery current from either the removable battery 120 or the resident battery, provide a DC output 307 to the inverter 308, which can then supply power 309 to one or more AC receptacles 310 in the head unit assembly 26.

Figure 17:
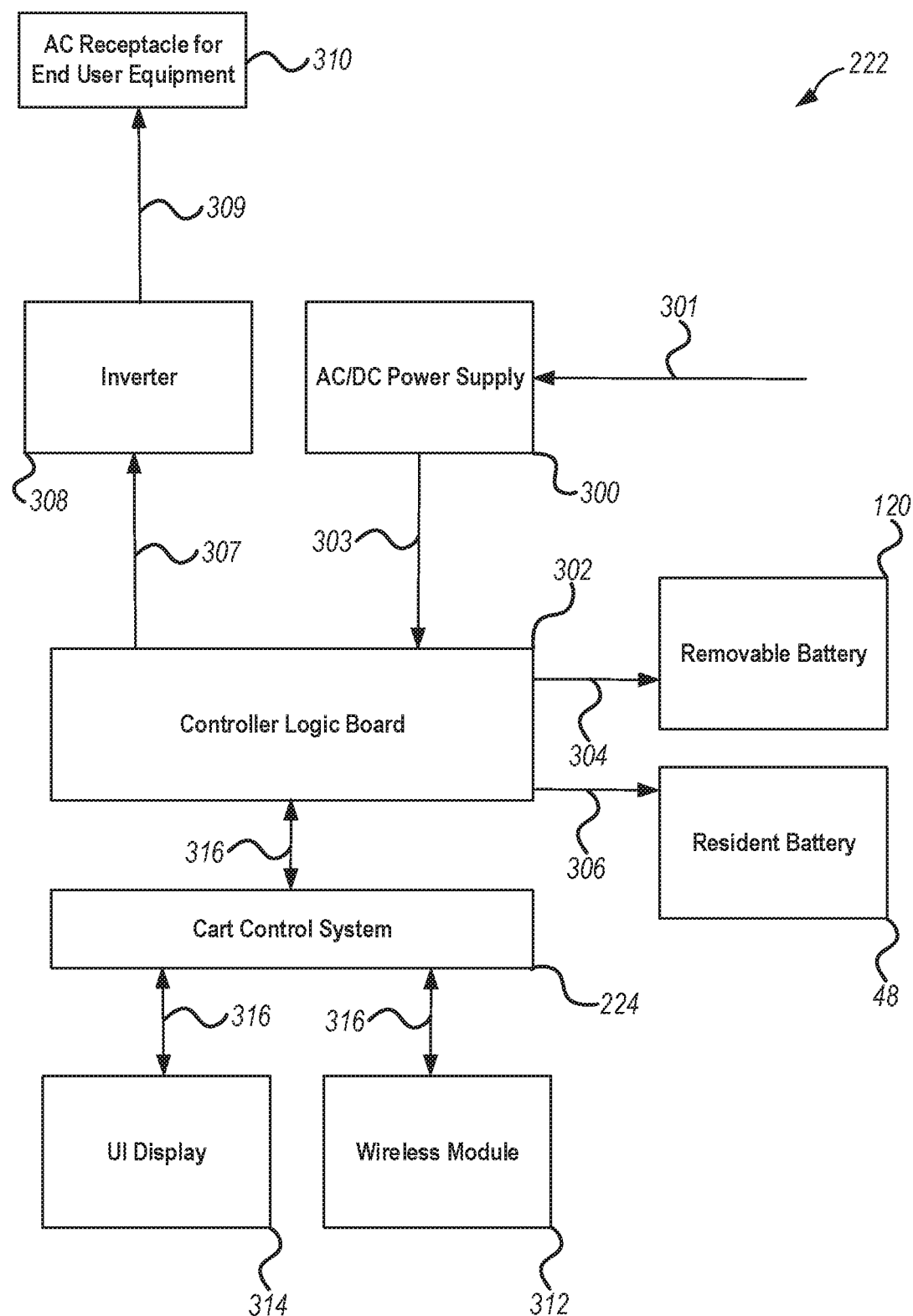
FIG. 17 is an example of a block diagram of the power module of FIG. 13 during system charging.

FIG. 17 is an example of a block diagram of the power module 222 of FIG. 13 during system charging. The AC/DC power supply 300 can receive AC power 301 and output DC power 303 to the controller logic board 302. The controller logic board 302 (or "controller") can include charging circuitry configured to provide a first charge current 304 to the removable battery 120 (or removable battery 52) and a second charge current 306 to the resident battery 48, dependent on the mode of operation as described above with respect to FIG. 14.

In addition, the controller 302 can output DC power 307 to an inverter 308 to supply power 309 to one or more AC receptacles 310 in the head unit assembly 212 of FIG. 11.

The workstation 200 can include a cart control system 224 configured to receive data 316 from the power module 222. The cart control system 224 can be in communication with the power module 222 over a data bus of the coiled cord 230 of FIG. 12. The cart control system 224 can contain an electronic display, LCD display, to show power system information as well as other functions of the cart. The cart control system contains a WiFi module to relay information from the power system to a connected database.

Coupled to the cart control system 224 can be a wireless communication circuit 312, e.g., Wi-Fi module, and a user interface display 314. The cart control system 224 can communicate data 316 to and receive data 316 from the wireless communication circuit 312 and the user interface display 314.

Figure 18:
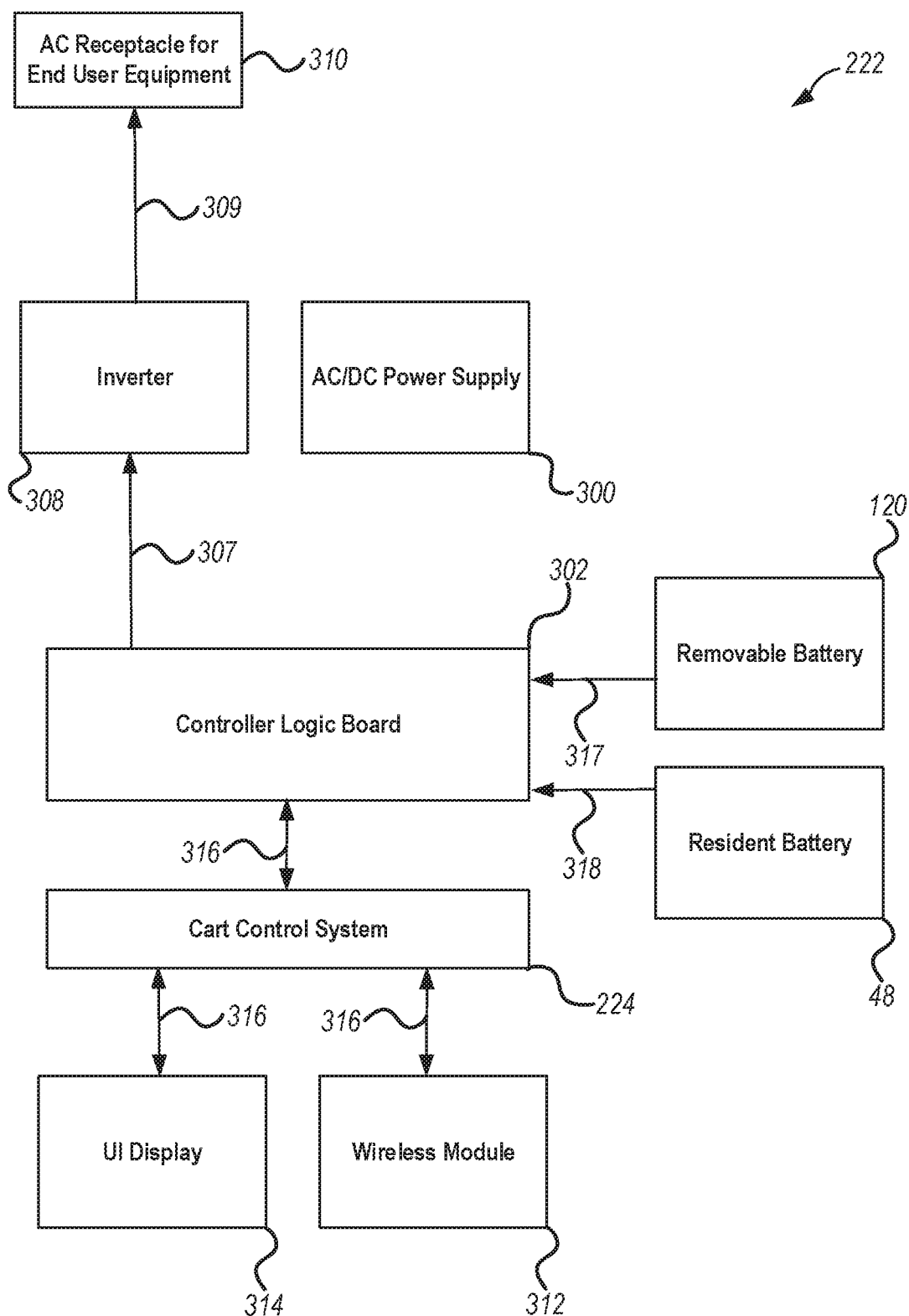
FIG. 18 depicts the block diagram of FIG. 17 during system discharging.

FIG. 18 depicts the block diagram of FIG. 17 during system discharging. As seen in FIG. 18, after the AC power input 301 to the AC/DC power supply 300 has been removed, either the removable battery 120 or the resident battery 48 can supply battery current 317, 318, respectively, to the controller 302, dependent on the mode of operation as described above with respect to FIG. 14.

Figure 19:
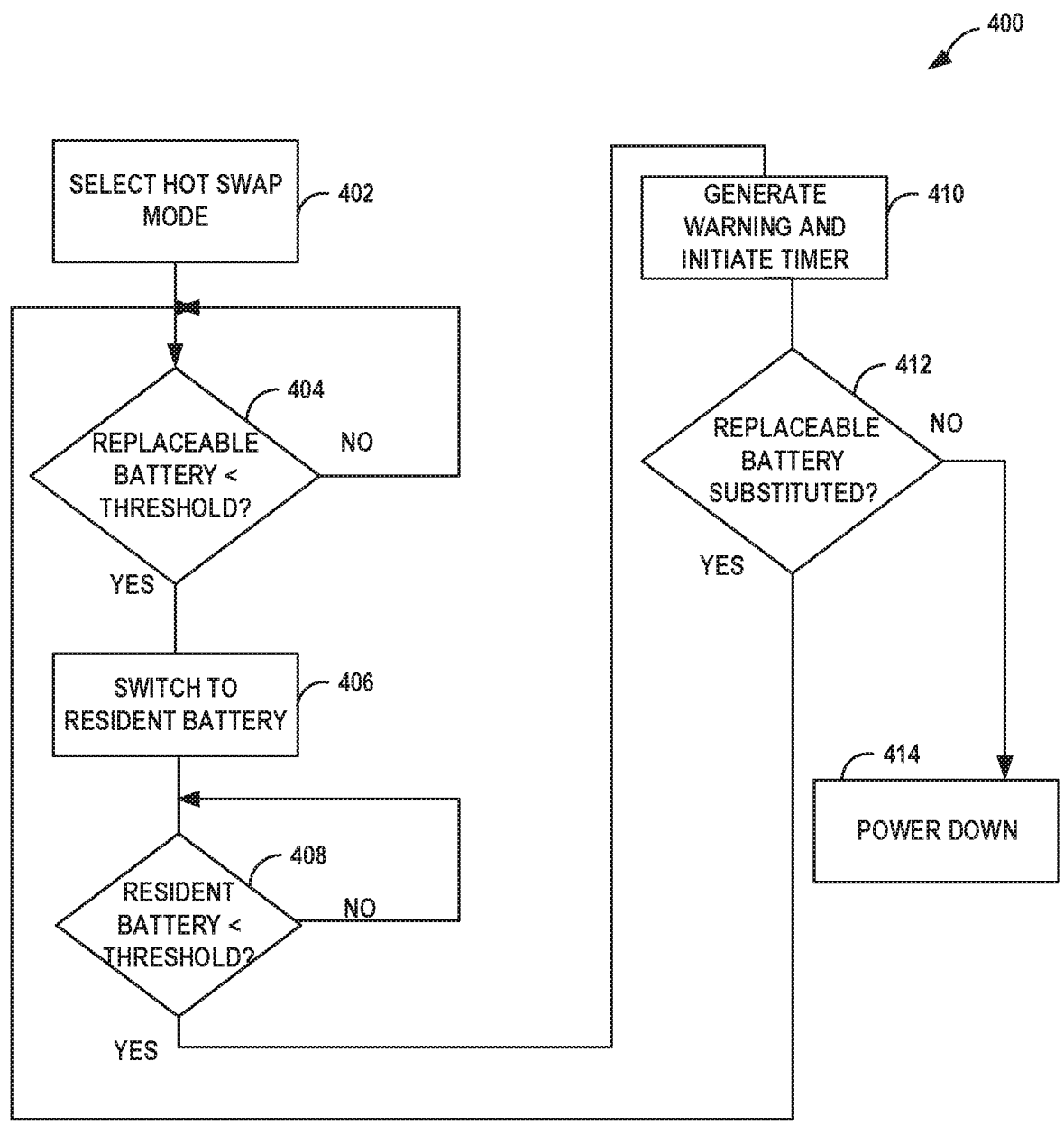
FIG. 19 is a flow diagram of an example of a method of operating a workstation in a how swap mode of operation.

FIG. 19 is a flow diagram of an example of a method 400 of operating a workstation in a hot swap mode of operation. At block 402, the controller logic circuit, e.g., the controller logic circuit 302 of FIG. 15, can determine if the hot swap mode has been selected. At block 404, the controller logic circuit can determine whether the replaceable battery, e.g., replaceable battery 120 of FIG. 15, is below a threshold capacity level. If the replaceable battery is not below the threshold level ("NO" branch of decision block 404), then the controller logic circuit can continue monitoring the replaceable battery capacity. If the replaceable battery capacity is below the threshold level ("YES" branch of decision block 404), then, at block 406, the controller logic circuit can switch the power supply of the workstation to the resident battery, e.g., resident battery 48 of FIG. 15.

At block 408, the controller logic circuit can determine whether the replaceable battery, e.g., replaceable battery 120 of FIG. 15, is below a threshold capacity level. If the resident battery is not below the threshold level ("NO" branch of decision block 408), then the controller logic circuit can continue monitoring the resident battery capacity. If the resident battery capacity is below the threshold level ("YES" branch of decision block 408), then, at block 410, the controller logic circuit can generate a warning to a user and initiate a timer.

If the replaceable battery is not substituted by the end of the timer ("NO" branch of decision block 412), then the workstation can power down at block 414, If the replaceable battery is substituted by the end of the timer ("YES" branch of decision block 412), then the flow can return to block 404 where the controller logic circuit can monitor the capacity of the replaceable battery.

Figure 20:
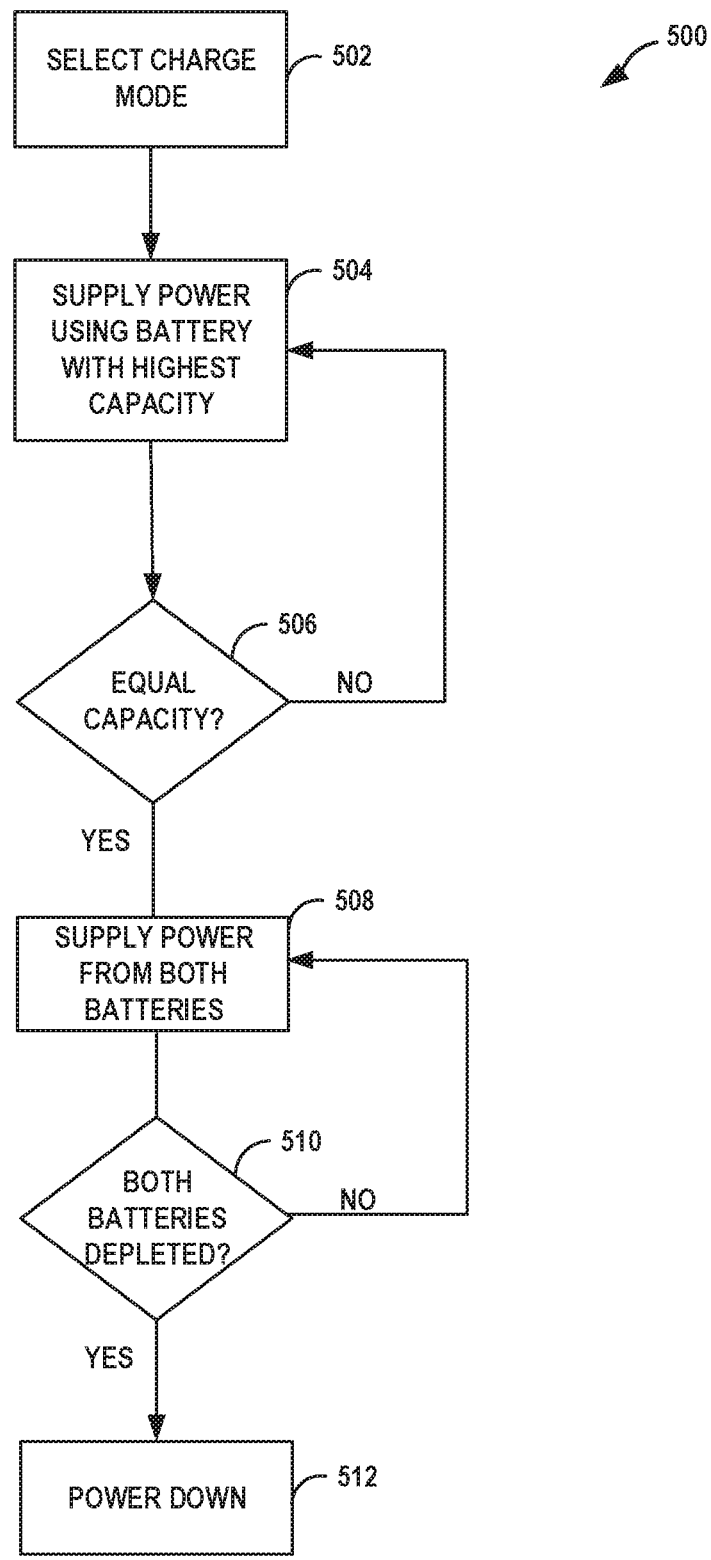
FIG. 20 is a flow diagram of an example of a method of operating a workstation in a charge mode of operation.

FIG. 20 is a flow diagram of an example of a method 500 of operating a workstation in a charge mode of operation. At block 502, the controller logic circuit, e.g., the controller logic circuit 302 of FIG. 15, can determine if the charge has been selected. At block 504, the controller logic circuit can supply power using the battery with the highest capacity, e.g., replaceable battery or resident battery.

At block 506, the controller logic circuit can determine whether the replaceable battery and the resident battery have equal capacity. If the two batteries do not have equal capacity ("NO" branch of decision block 506), then the controller logic circuit can continue to supply power using the battery with the highest capacity at block 504. If the two batteries do have equal capacity ("YES" branch of decision block 506), then the controller logic circuit can supply power using both batteries at block 508.

At block 510, the controller logic circuit can determine whether both batteries are depleted. If both batteries are not depleted ("NO" branch of decision block 510), then the controller logic circuit can continue supplying power from both batteries at block 508. If both batteries are depleted, however, ("YES" branch of decision block 510); then; at block 512; the system can power down.

Additional Notes and Aspects

Aspect 1 may include or use subject matter (such as an apparatus, a system, a device, a method, a means for performing acts, or a device readable medium including instructions that, when performed by the device, may cause the device to perform acts), such as may include or use an a mobile powered workstation comprising: a head unit assembly having at least one power outlet configured to provide power to at least one electronic device; a riser coupled to the head unit assembly; a base coupled to the riser; and a power system coupled to the head unit assembly, the power system including: a permanent battery; and a battery assembly coupled to the riser, the battery assembly including a battery connection housing having a plurality of power connectors configured to electrically couple to a corresponding plurality of power connectors of a replaceable battery, the battery connection housing having a first face and a second face that extends from the first face, wherein a portion of the first face defines a first raised portion configured to engage with a corresponding first recessed portion in the replaceable battery, wherein a portion of the second face defines a second raised portion configured to engage with a corresponding second recessed portion in the replaceable battery, and wherein at least one of the permanent battery and the replaceable battery are configured to supply power to the head unit assembly.

Aspect 2 may include or use, or may optionally be combined with the subject matter of Aspect 1, to optionally include or use at least one magnet positioned in at least one of the first raised portion and the second raised portion, the at least one magnet configured to engage with a corresponding magnet or ferromagnetic material in at least one of the first recessed portion and the second recessed portion of the replaceable battery.

Aspect 3 may include or use, or may optionally be combined with the subject matter of one or any combination of Aspects 1 or 2 to optionally include or use at least one ferromagnetic material positioned in at least one of the first raised portion and the second raised portion, the at least one ferromagnetic material configured to engage with a corresponding magnet in at least one of the first recessed portion and the second recessed portion of the replaceable battery.

Aspect 4 may include or use, or may optionally be combined with the subject matter of one or any combination of Aspects 1 through 3 to optionally include or use wherein the battery connection housing includes an L-shaped cross-section.

Aspect 5 may include or use, or may optionally be combined with the subject matter of one or any combination of Aspects 1 through 4 to optionally include or use the replaceable battery, wherein the replaceable battery includes: a button; and at least one push pin mechanically coupled to the button, wherein, when depressed, the button is configured to extend the at least one push pin away from the replaceable battery.

Aspect 6 may include or use, or may optionally be combined with the subject matter of Aspect 5 to optionally include or use wherein the at least one push pin is spring loaded and biased toward an interior of the replaceable battery.

Aspect 7 may include or use, or may optionally be combined with the subject matter of one or any combination of Aspects 5 or 6 to optionally include or use wherein the replaceable battery further includes a handle, and wherein the button is coupled to a portion of the handle.

Aspect 8 may include or use, or may optionally be combined with the subject matter of one or any combination of Aspects 1 through 7 to optionally include or use wherein the permanent battery is coupled to the base.

Aspect 9 may include or use, or may optionally be combined with the subject matter of one or any combination of Aspects 1 through 8 to optionally include or use wherein the power system includes a controller configured to operate the power system in a hot swap mode and a charging mode.

Aspect 10 may include or use, or may optionally be combined with the subject matter of Aspect 9 to optionally include or use a wireless communication circuit coupled to the controller and configured to communicate battery data with a network device connected to a network.

Aspect 11 may include or use, or may optionally be combined with the subject matter of one or any combination of Aspects 1 through 10 to optionally include or use a display coupled to the controller and configured to display battery data to a user.

Aspect 12 may include or use, or may optionally be combined with the subject matter of one or any combination of Aspects 1 through 11 to optionally include or use wherein the riser is a telescoping riser.

Aspect 13 may include or use, or may optionally be combined with the subject matter of one or any combination of Aspects 1 through 12 to optionally include or use wherein the riser is a stationary riser.

Aspect 14 may include or use, or may optionally be combined with the subject matter of Aspect 13 to optionally include or use wherein the stationary riser includes a counterbalance mechanism having an energy storage member.

Aspect 15 may include or use subject matter (such as an apparatus, a system, a device, a method, a means for performing acts, or a device readable medium including instructions that, when performed by the device, may cause the device to perform acts), such as may include or use a mobile powered workstation comprising: a head unit assembly having at least one power outlet configured to provide power to at least one electronic device; a riser coupled to the head unit assembly; a base coupled to the riser; and a power system coupled to the head unit assembly, the power system including: a permanent battery; and a battery assembly coupled to the riser, the battery assembly including a battery connection housing having: a plurality of power connectors configured to electrically couple to a corresponding plurality of power connectors of a replaceable battery, the battery connection housing having a first face and a second face that extends from the first face, wherein a portion of the first face defines a first raised portion configured to engage with a corresponding first recessed portion in the replaceable battery, wherein a portion of the second face defines a second raised portion configured to engage with a corresponding second recessed portion in the replaceable battery; and at least one first magnet positioned in the first raised portion and at least one second magnet positioned in the second raised portion, wherein at least one of the permanent battery and the replaceable battery are configured to supply power to the head unit assembly.

Aspect 16 may include or use, or may optionally be combined with the subject matter of Aspect 15, to optionally include or use the replaceable battery, wherein the replaceable battery includes: a button; at least one push pin mechanically coupled to the button; and at least one first ferromagnetic material positioned in the first recessed portion and at least one second ferromagnetic material positioned in the second recessed portion of the replaceable battery.

Aspect 17 may include or use, or may optionally be combined with the subject matter of one or any combination of Aspects 15 or 16 to optionally include or use wherein the battery connection housing includes an L-shaped cross-section.

Aspect 18 may include or use subject matter (such as an apparatus, a system, a device, a method, a means for performing acts, or a device readable medium including instructions that, when performed by the device, may cause the device to perform acts), such as may include or use a mobile powered workstation comprising: a head unit assembly having at least one power outlet configured to provide power to at least one electronic device; a riser coupled to the head unit assembly; a base coupled to the riser; and a power system coupled to the head unit assembly, the power system including: a permanent battery; a replaceable battery including: a first recessed portion and a second recessed portion; a button; at least one push pin mechanically coupled to the button; and at least one first ferromagnetic material positioned in the first recessed portion and at least one second ferromagnetic material positioned in the second recessed portion of the replaceable battery; and a battery assembly coupled to the riser; the battery assembly including a battery connection housing having: a plurality of power connectors configured to electrically couple to a corresponding plurality of power connectors of the replaceable battery, the battery connection housing having a first face and a second face that extends from the first face, wherein a portion of the first face defines a first raised portion configured to engage with the first recessed portion in the replaceable battery, wherein a portion of the second face defines a second raised portion configured to engage with the second recessed portion in the replaceable battery; and at least one first magnet positioned in the first raised portion and at least one second magnet positioned in the second raised portion, wherein at least one of the permanent battery and the replaceable battery are configured to supply power to the head unit assembly.

Aspect 19 may include or use, or may optionally be combined with the subject matter of Aspect 18, to optionally include or use wherein the power system includes a controller configured to operate the power system in a hot swap mode and a charging mode.

Aspect 20 may include or use, or may optionally be combined with the subject matter of one or any combination of Aspects 18 or 19 to optionally include or use a wireless communication circuit coupled to the controller and configured to communicate battery data with a network device connected to a network.

Aspect 21 may include or use, or may optionally be combined with any portion or combination of any portions of any one or more of Aspects 1 through 20 to include or use, subject matter that may include means for performing any one or more of the functions of Aspects 1 through 20, or a machine-readable medium including instructions that, when performed by a machine, cause the machine to perform any one or more of the functions of Aspects 1 through 20.

The above detailed description includes references to the accompanying drawings, which form a part of the detailed description. The drawings show, by way of illustration, specific embodiments in which the invention can be practiced. These embodiments are also referred to herein as "examples" or "aspects". Such examples or aspects can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A mobile powered workstation comprising:
   at least one power outlet configured to provide power to at least one electronic device;
   a riser coupled to a head unit assembly;
   a base coupled to the riser; and
   a power system including:
      a permanent battery;
      a battery assembly, the battery assembly including a battery connection housing having a plurality of power connectors configured to electrically couple to a corresponding plurality of power connectors of a replaceable battery; and
      a controller configured to compare a first capacity of the permanent battery with a second capacity of the replaceable battery to switch the power system between a first power mode and a second power mode, wherein:
         at least one of the permanent battery and the replaceable battery are configured to supply power to the power system;
         in the first power mode, the power system is configured to supply power to the at least one power outlet by receiving power from the replaceable battery; and
         in the second power mode, the power system is configured to supply power to the at least one power outlet by receiving power simultaneously from each of the permanent and the replaceable battery.

2. The mobile powered workstation of claim 1, further comprising:
   at least one magnet positioned in at least one of a first raised portion of a battery connection housing or a second raised portion of the battery connection housing, the at least one magnet configured to engage with a corresponding magnet or ferromagnetic material in at least one of a first recessed portion of the replaceable battery or a second recessed portion of the replaceable battery.

3. The mobile powered workstation of claim 1, further comprising:
   at least one ferromagnetic material positioned in the battery connection housing, the at least one ferromagnetic material configured to engage with a corresponding magnet positioned in the replaceable battery.

4. The mobile powered workstation of claim 1, further comprising:
   a display in communication with the power system, wherein the display is configured to provide battery data to a user.

5. The mobile powered workstation of claim 1, further comprising:
   the replaceable battery, wherein the replaceable battery includes:
      a button; and
      at least one push pin mechanically coupled to the button, wherein, when depressed, the button is configured to extend the at least one push pin away from the replaceable battery.

6. The mobile powered workstation of claim 5, wherein the at least one push pin is spring loaded and biased toward an interior of the replaceable battery.

7. The mobile powered workstation of claim 5, wherein the replaceable battery further includes a handle, and wherein the button is coupled to a portion of the handle.

8. The mobile powered workstation of claim 1, wherein the permanent battery is coupled to the base.

9. The mobile powered workstation of claim 1, further comprising:
   a wireless communication circuit coupled to the controller and configured to communicate battery data with a network device connected to a network.

10. The mobile powered workstation of claim 1, wherein the power system is user-configurable to change between a first power mode and the second power mode.

11. The mobile powered workstation of claim 1, wherein the riser is a telescoping riser.

12. The mobile powered workstation of claim 1, wherein the riser is a stationary riser.

13. The mobile powered workstation of claim 12, wherein the stationary riser includes a counterbalance mechanism having an energy storage member.

14. The mobile powered workstation of claim 1, wherein the power system is user-configurable to change between the first power mode and the second power mode.

15. A mobile powered workstation comprising:
   at least one power outlet configured to provide power to at least one electronic device;
   a riser coupled to a head unit assembly;
   a base coupled to the riser; and
   a power system including:
      a permanent battery;
      a battery assembly including a battery connection housing having a plurality of power connectors configured to electrically couple to a corresponding plurality of power connectors of a replaceable battery; and
      wherein at least one of the permanent battery and the replaceable battery are configured to supply power to the power system, and the power system includes a controller that is configured to compare a first capacity of the permanent battery with a second capacity of the replaceable battery and switch the power system between at least a first power mode and a second power mode and in each of the first power mode and the second power mode supplies operating power for operation of the at least one power outlet, wherein:
         in the first power mode, the power system is configured to supply power to the at least one power outlet by receiving power from the replaceable battery; and
         in the second power mode, the power system is configured to supply power to the at least one power outlet by simultaneously receiving power from each of the permanent battery and the replaceable battery.

16. The mobile powered workstation of claim 15, further comprising:
   the replaceable battery, wherein the replaceable battery includes:
      a button;

at least one push pin mechanically coupled to the button; and at least one first ferromagnetic material positioned in a first recessed portion of the replaceable battery and at least one second ferromagnetic material positioned in a second recessed portion of the replaceable battery.

17. The mobile powered workstation of claim 15, wherein the power system is user-configurable to change between the first power mode and the second power mode.

18. A mobile powered workstation comprising:
   at least one power outlet configured to provide power to at least one electronic device;
   a riser coupled to a head unit assembly;
   a base coupled to the riser; and
   a power system including:
      a permanent battery;
      a battery assembly, the battery assembly including a battery connection housing having a plurality of power connectors configured to electrically couple to a corresponding plurality of power connectors of a replaceable battery; and
      a controller configured to compare a first capacity of the permanent battery with a second capacity of the replaceable battery and switch the power system between at least a first power mode and a second power mode, wherein:
         at least one of the permanent battery and the replaceable battery are configured to supply power to the power system;
         in the first power mode, the power system is configured to supply power to the at least one power outlet by receiving power from the replaceable battery; and
         in the second power mode, the power system is configured to supply power to the at least one power outlet by receiving power simultaneously from each of the permanent and the replaceable battery.

19. The mobile powered workstation of claim 18, wherein the controller is configured to automatically switch the power system between the first power mode and the second power mode by monitoring by monitoring a frequency the replaceable battery is removed and a frequency that the mobile powered workstation is plugged in to charge to switch the power system between the first power mode and the second power mode to improve performance of the mobile powered workstation.

* * * * *